(12) United States Patent
Murata et al.

(10) Patent No.: US 6,488,475 B2
(45) Date of Patent: Dec. 3, 2002

(54) ELECTRIC BLOWER AND ELECTRIC CLEANER WITH AN AIR COOLED POWER DEVICE SITUATED BETWEEN THE IMPELLER AND MOTOR

(75) Inventors: Yoshitaka Murata, Hikone (JP); Seiji Yamaguchi, Shiga (JP); Tsuyoshi Tokuda, Hikone (JP); Tsuyoshi Nishimura, Shiga (JP); Kazuhisa Morishita, Youkaichi (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/816,156

(22) Filed: Mar. 26, 2001

(65) Prior Publication Data

US 2001/0036409 A1 Nov. 1, 2001

(30) Foreign Application Priority Data

Mar. 30, 2000 (JP) ........................................ 2000-093170
Jul. 12, 2000 (JP) ........................................ 2000-211056
Jul. 13, 2000 (JP) ........................................ 2000-212340
Jul. 28, 2000 (JP) ........................................ 2000-228623
Sep. 6, 2000 (JP) ........................................ 2000-269814

(51) Int. Cl.⁷ ................................................. F04B 49/06
(52) U.S. Cl. ........................ 417/32; 417/44.1; 417/368; 417/369; 417/423.1; 417/423.14
(58) Field of Search ....................... 417/32, 44.1, 368, 417/369, 423.1, 423.14

(56) References Cited

U.S. PATENT DOCUMENTS 4,405,971 A * 9/1983 Ohsawa ...................... 361/761
4,773,829 A * 9/1988 Vettori ....................... 310/68 R
5,343,104 A * 8/1994 Takahashi et al. ......... 310/67 R
6,011,331 A * 1/2000 Gierer et al. ................. 310/52
6,358,005 B1 * 3/2002 Berfield ....................... 415/206

FOREIGN PATENT DOCUMENTS

JP 04022320 A * 1/1992 ................... 417/32

* cited by examiner

Primary Examiner—Charles G. Freay
Assistant Examiner—Emmanuel Sayoc
(74) Attorney, Agent, or Firm—Wenderoth, Lind & Ponack, L.L.P.

(57) ABSTRACT

An electric blower includes a motor unit having a stator and a rotor, a fan unit having an impeller attached to an output shaft of the rotor, and a circuit unit having a heat-generating component for controlling electric power to the motor unit. The circuit unit is arranged in an airflow path of air expelled from an outer periphery of the impeller toward the stator and the rotor of the motor unit. The air suctioned by rotation of the impeller cools the heat-generating component in the circuit unit before cooling the stator and the rotor.

36 Claims, 27 Drawing Sheets

ELECTRIC BLOWER AND ELECTRIC CLEANER WITH AN AIR COOLED POWER DEVICE SITUATED BETWEEN THE IMPELLER AND MOTOR

FIELD OF THE INVENTION

The present invention relates to an electric blower mainly used for an electric cleaner, and in particular, it aims at reducing the size of a main body of the electric cleaner to improve usability.

BACKGROUND OF THE INVENTION

As electric cleaners of the prior art, there are used mainly those of the un-circulated exhaust type shown in FIG. 24 and those of the circulated exhaust type shown in FIG. 25. An outline of the electric cleaners of the prior art will be described hereinafter.

An electric cleaner 1 of the un-circulated exhaust type shown in FIG. 24 has a hose 3 connected detachably to its main body 2. Another end of the hose 3 is provided with an end pipe 5 having a control section 4. An extension pipe 6 is attached to the end pipe 5, and a head of the extension pipe 6 is connected with a suction nozzle 7. In the cleaner's main body 2, there is a dust chamber 8 formed in communication with the hose 3. Also provided behind the dust chamber 8 are an electric blower 10 disposed in such a manner that a suction port 9 faces toward the dust chamber 8, and a power supply unit 11 housing a cord for connection to commercial power supply, a battery, or the like.

FIG. 25 shows an electric cleaner of the circulated exhaust type. Like reference numerals are used to designate components like those of the un-circulated exhaust type. The circulated exhaust type further has the following structure in addition to the structure of the un-circulated exhaust type. A main body exhaust path 13 is formed from a discharge port 12 of an electric blower 10 to a connecting area of a cleaner's main body 2 for connection to a hose 3. Further, there are a suction passage 14 representing an airflow pass in communication with a dust chamber 8 leading to a suction port 9 of the electric blower 10, and an exhaust passage 15 for delivering exhaust flow of air expelled from the discharge port 12 at a rear side of the electric blower 10 via the main body exhaust path 13 to a front end of the hose 3, formed respectively in the hose 3, an extension pipe 6, and a suction nozzle 7. The passages are constructed so as to be independent with respect to each other, and also separated from the open air space.

The electric blower will be described now.

Most motor units for electric blowers used heretofore in the electric cleaners have been commutator motors, which are the type generally referred to as universal motors. Lately, inverter motors have been used for the purpose of achieving reduction in size and weight by increasing speed, easiness of controlling rotational speed, cutback in power consumption, suppressing temperature rises, and so on. However, an inverter motor has an increased number of power devices in its circuit, as compared to a commutator motor. For an inverter motor consisting of windings of three phases, for instance, six power devices are required. It is therefore necessary to cool the plurality of power devices efficiently.

A structure of the conventional electric blower will be described hereinafter.

As shown in FIG. 26, the electric blower 10 comprises a motor unit 16 and a fan unit 17. A rotor 22 constructed of an armature core 19, provided with an armature winding 18 and a commutator 20 mounted on a shaft 21, is installed on an impeller-side bracket 25 and a motor-side bracket 26 in a freely rotatable manner with bearings 23 and 24. The brackets 25 and 26 compose an enclosure of the motor unit 16. A stator 29 provided with a field winding 28 on a field core 27, and a holder 30 carrying a carbon brush (not shown in the figure) are secured to the bracket 26.

The fan unit 17 comprises an impeller 31 attached to the shaft 21 of the motor unit 16, an air guide 32 disposed around the impeller 31 to form an airflow path for leading a flow of the air delivered from the impeller 31 to an interior of the motor unit 16 while gradually recovering its pressure, and a casing 33 covering them. The fan unit 17 is mounted integrally to the bracket 25. The bracket 25 is also provided with a cooling air discharge port 34 in a part thereof for discharging a portion of the airflow delivered from the impeller 31, without passing through the interior of the motor unit 16.

A circuit unit 35 for controlling electric power supplied to the electric blower 10 comprises a circuit board 38 housed in a circuit board enclosure 39, and is connected with a power supply wire 36 connected to the power supply unit 11, a signal wire 37 for transmitting an operating signal from the control section 4, and so on. The circuit unit 35 is mounted on the bracket 25 of the electric blower 10 with a screw 40. A radiating fin 42 for a power device 41 or a heat-generating component such as a triac is arranged in the circuit unit 35 in an airflow path between a cooling air inflow port 43 and a cooling air outflow port 44 in the circuit board enclosure 39, where a flow of air expelled through the cooling air discharge port 34 of the fan unit 17 flows through.

When the electric cleaner 1 is operated, the electric blower 10 produces a suctioning force. Contaminated air containing dust is suctioned from an inlet port of the suction nozzle 7, and reaches to the dust chamber 8 in the cleaner's main body 2 through the suction passage 14 in the suction nozzle 7, the extension pipe 6 and the hose 3. The air is then guided to the electric blower 10, after the dust and the like are removed. At the same time, the power device 41 is cooled by the flow of discharge air expelled through the cooling air discharge port 34.

As described, the conventional electric cleaner divides the flow of air that passes through the fan unit 17 into a flow of air to the motor unit 16 and another flow of air to cool the radiating fin 42 in order to cool the power device 41, etc. efficiently with the radiating fin 42 of small size, regardless of whether it is the circulated exhaust type, or not. Thus, the structure needs to be such that the radiating fin 42 or the circuit unit 35 is placed downstream of the cooling air discharge port 34 of the fan unit 17. It is also necessary to separate only the power device 41 portion from the circuit unit 35, to further enhance the heat dissipation. They become a structural problem within the cleaner's main body 2, making it difficult to reduce the size of the cleaner's main body 2.

The following description pertains to an electric blower controlled by an inverter.

An electric blower 10 comprises an inverter motor 47 consisting of a motor unit 45 and an inverter circuit unit 46, and a fan unit 48, as shown in FIG. 27. The electric blower 10 is held so that it is pressed against a retaining rib 53 on a partition 52 having a large number of through holes 51 and separating the electric blower 10 from a dust chamber 8 via a support rubber 50 placed on an outer periphery of a casing 49.

A rotor 56 provided with a permanent magnet 54 and a shaft 55 is installed on an impeller-side bracket 59 and a motor-side bracket 60 in a freely rotatable manner with bearings 57 and 58. The bracket 59 and the bracket 60 are connected to compose an enclosure of the motor unit 45. A stator 63 constructed of a core 19 provided with a stator winding 62 in a plurality of slots formed in a manner to confront the permanent magnet 54, is secured to the bracket 60. The rotor 56, the brackets 59 and 60, and the stator 63 compose the motor unit 45.

The inverter circuit unit 46 for controlling the inverter motor 47 is mounted on a circuit board 66, which is connected with a power supply wire 64 in connection to the power supply unit 11, a signal wire 65 for transmitting an operating signal and a rotating-speed control signal for the cleaner's main body 2, and the like. It is disposed in the vicinity of the electric blower 10. A large radiating fin 68 for cooling is attached to the heat generating components such as a switching element 67 in the inverter circuit unit 46. The radiating fin 68 is sealed with sealant 69 and tightly bonded in an area near the airflow path to prevent leakage of the air.

A position detecting means for detecting a position of the rotor 56 necessary for controlling the inverter motor 47 comprises a sensor magnet 70 provided on the rotor 56 and a position detecting element 71 such as a hole element or the like for detecting a magnetic pole of the sensor magnet 70. The position detecting element 71 is mounted on a detector board 72, which is fixed to the motor-side bracket 60, and is disposed in the motor unit 45. An output signal of the position detecting element 71 is connected to the circuit board 66 with a position detecting signal wire 73.

The fan unit 48 comprises an impeller 74 attached integrally to the shaft 55, an air guide 75 disposed around a periphery of the impeller 74 to form an airflow path for leading a flow of air delivered by the impeller 74 to an upper surface of the impeller-side bracket 59 while gradually recovering its pressure, and a casing 49 covering them. The casing 49 is constructed so as to be mounted integrally with the impeller-side bracket 59 or the motor-side bracket 60.

When the electric cleaner 1 is operated, the electric blower 10 produces a suctioning force. Contaminated air containing dust is suctioned by the suction nozzle 7, and guided through the suction nozzle 7, the extension pipe 6, the hose 3, and to the electric blower 10, after the dust is removed in the dust chamber 8 in the cleaner's main body 2. At the same time, the radiating fin 68 disposed in the airflow path near the suction port 9 or the like of the electric blower 10 is cooled by the air flowing into the electric blower 10. Consequently, the switching element 67 (i.e. the heat-generating component on the circuit board 66) is cooled.

For the conventional electric cleaner of the foregoing structure, it is necessary to ensure air-tightness for the suctioned air in the dust chamber 8 side of the electric blower 10 in order to efficiently cool the heat-generating component such as the switching element 67, etc. with the radiating fin 68, and to dispose the radiating fin 68 in a position that allows cooling with cool air before it passes through an interior of the motor unit 45. This imposes a limitation on the location where the inverter circuit unit 46 can be arranged in cleaner's main body 2. It also requires consideration of the sealant 69, the sealing structure and so on, to ensure the air-tightness. In addition, it requires special care for easiness of assembly. The inverter motor 47, in particular, is associated with a larger number of heat-generating components such as the switching element 67 in the inverter circuit unit 46. It is therefore necessary to take such measures as enlarging an area of the radiating fin 68. However, this leads to an upsizing of the inverter circuit unit 46, and is one of the factors that prevents downsizing of the cleaner's main body 2.

SUMMARY OF THE INVENTION

The present invention is derived in light of the above problems of the prior arts. In particular, an electric blower of the present invention comprises a motor unit provided with a freely rotatable rotor and a stator, an impeller mounted on an output shaft of the rotor, and a fan unit comprised of a casing covering the impeller. It is provided with a circuit unit, which controls electric power to the motor unit, disposed in an airflow path for the air expelled from an outer periphery of the impeller and delivered to the rotor and the stator of the motor.

Further, an electric cleaner of the present invention comprises a dust chamber for collecting dust, a suction port connected in communication to the dust chamber, and the above-said electric blower.

DESCRIPTION OF THE PREFERRED EMBODIMENTS

With reference to the accompanying drawings, exemplary embodiments of the present invention will be described hereinafter.

First Exemplary Embodiment

Figure 1:
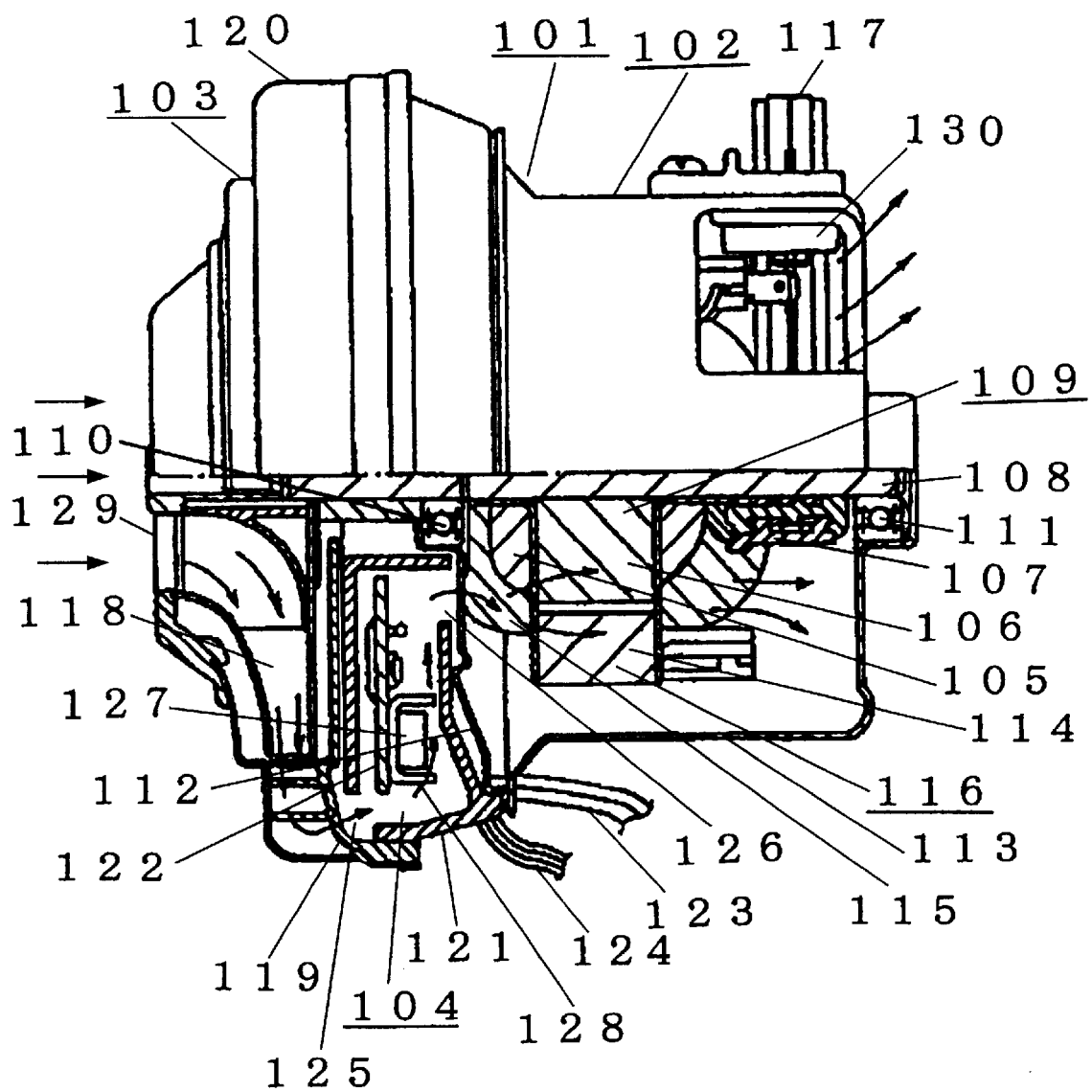
FIG. 1 is a partially sectioned side view of an electric blower of a first exemplary embodiment of the present invention.

An electric blower 101 comprises three sections including a motor unit 102, a fan unit 103, and a circuit unit 104, as shown in FIG. 1.

A rotor 109 is composed of an armature core 106 provided with an armature winding 105 and a commutator 107 attached to a shaft 108. The shaft 108 is constructed to be freely rotatable with respect to an impeller-side bracket 112 and a motor-side bracket 113 via bearings 110 and 111. The brackets 112 and 113 are connected to compose an enclosure of the motor unit 102. A stator 116 provided with a field winding 115 on a field core 114, and a holder 117 carrying in its inside a carbon brush (not show in the figure) are secured to the bracket 113.

The fan unit 103 comprises an impeller 118 attached to the shaft 108 of the motor unit 102, an air guide 119 disposed around the impeller 118 to form an airflow path for leading the flow of air delivered from the impeller 118 to an interior of the motor unit 102 while gradually recovering its pressure, and a casing 120 covering them. The fan unit 103 is mounted integrally to the bracket 112.

The circuit unit 104 has a circuit board 122, disposed in a circuit board enclosure 121 constructed of insulative material, for controlling electric power to the motor unit 102. The circuit board 122 is connected with a power supply wire 123 for connection to a power supply unit of the cleaner, and a signal wire 124 for transmitting an operating command signal from the cleaner. The enclosure 121 is arranged so as to be located in a space between the bracket 112 and the air guide 119 of the fan unit 103. There is a cooling air inflow port 125 located in a front lower area of the enclosure 121. There is a cooling air outflow port 126 located at a side of the bracket 112 in communication with an interior of the motor unit 102. The inflow port 125 and the outflow port 126 form an airflow path within the enclosure 121 for the exhaust air delivered by the fan unit 103. A triac defining a power device 127 for controlling electric power is mounted integrally with a small radiating fin 128 so as to be located in a part of the airflow path on the circuit board 122.

When the electric blower 101 operates, the impeller 118 rotates to produce suctioning force. This causes air in front of the casing 120 to flow into the impeller 118 from the suction port 129, and to be expelled from an outer periphery of the impeller 118. A flow of the air expelled from the impeller 118 is led to the inflow port 125 in the circuit board enclosure 121, while being decelerated along the airflow path formed by the air guide 119 and an interior surface of the casing 120, and having its pressure recovered.

The flow of air through the inflow port 125 into the circuit board enclosure 121 passes the airflow path, and travels toward the outflow port 126. It then cools the heat-generating bodies in the vicinity of the airflow path. The flow of air expelled from the outflow port 126 is discharged further from the discharge port 130 to the outside of the motor unit 102 after passing through the interior of the motor unit 102. The heat-generating components such as the armature winding 105, the armature core 106, the field core 114, the field winding 115, the carbon brush (not show in the figure), and so forth are cooled at this time.

As described above, the flow of air expelled from the fan unit 103 cools the power device 127 in the circuit unit 104 before it passes through the heat-generating parts of the motor unit 102. That is, the power device in the circuit unit 104 can be cooled efficiently by the air of relatively low temperature with a large volume. Therefore, the radiating fin 128 can be reduced in size. Further, there are even cases in which the radiating fin can be made unnecessary. As described above, this embodiment can realize a reduction in size as well as saving space in the circuit unit 104, and thereby the electric blower 101 can be downsized.

Second Exemplary Embodiment

Figure 2:
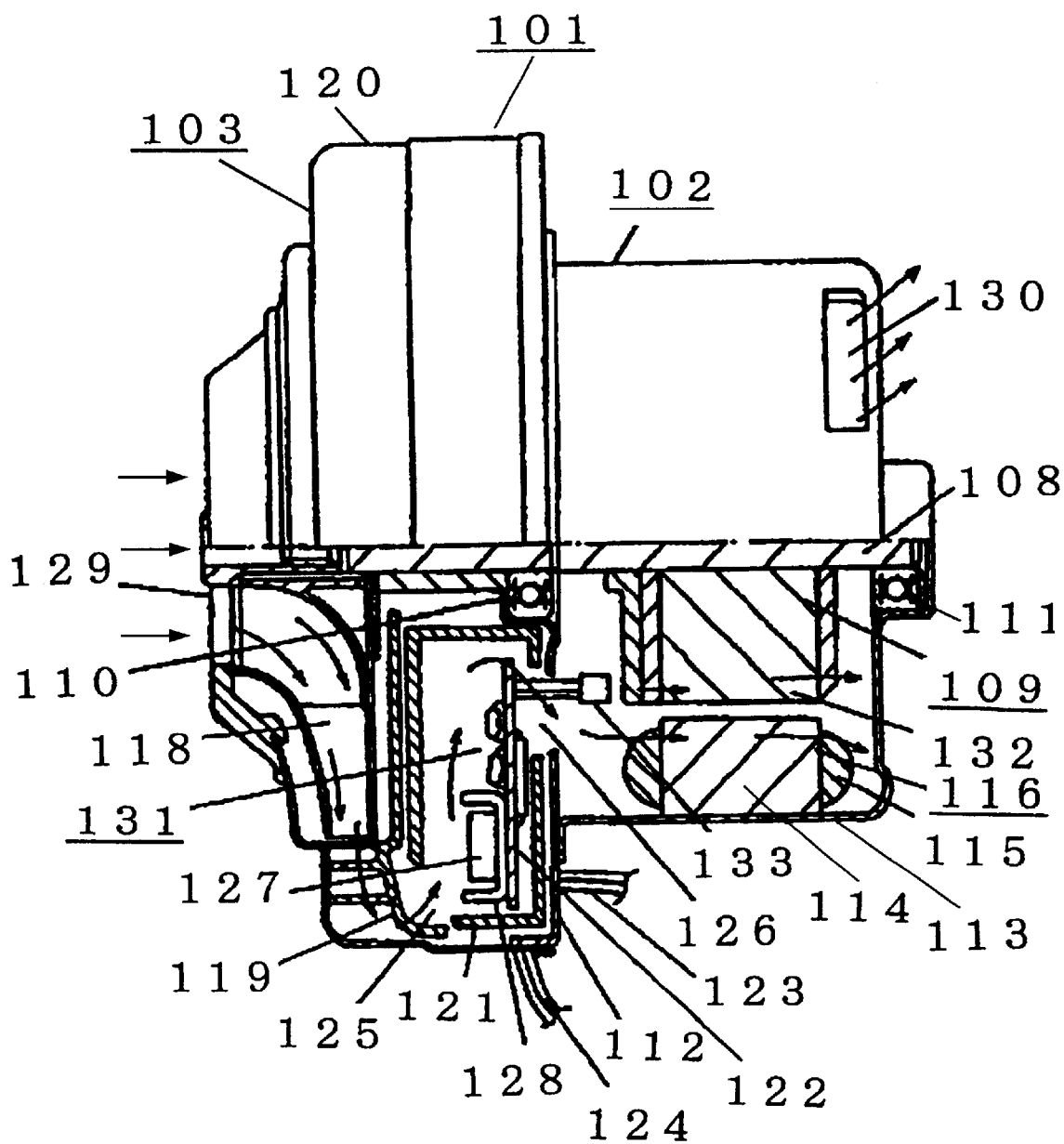
FIG. 2 is a partially sectioned side view of an electric blower of a second exemplary embodiment of the present invention.

Referring now to FIG. 2, a second exemplary embodiment of this invention will be described. Like reference numerals are used to designate structural components like those of the first exemplary embodiment, and their details will be skipped.

An electric blower 101 comprises a motor unit 102, a fan unit 103, and an inverter circuit unit 131, as shown in FIG. 2.

A rotor 109 is constructed with a shaft 108 having a magnet 132 mounted thereon into a cylindrical shape. The rotor 109 is mounted on an impeller-side bracket 112 and a motor-side bracket 113 in a freely rotatable manner with a load-side bearing 110 and a no-load-side bearing 116. The bracket 112 and the bracket 113 are connected to compose an enclosure of the motor unit. A stator 116 constructed of a core 114 provided with a stator winding 115 is secured to the motor-side bracket 113. The rotor 109 and the stator 116 compose the motor unit 102.

The inverter circuit unit 131 is disposed in a circuit board enclosure 121 constructed of insulative resin. The circuit unit 131 consists of a circuit board 122, on which a power device 127 for controlling electric power to the motor unit 102, a hole element for detecting a position of the rotor, and the like are mounted. The circuit board 122 is connected with a power supply wire 123 and a signal wire 124 for transmitting an operating command signal from a control section. The circuit board enclosure 121 is arranged so as to be located in a space between the bracket 112 and the air guide 119 of the fan unit 103. A cooling air inflow port 125 of a desired opening area is located in a front lower part of the enclosure 121, and a cooling air outflow port 126 is located at a side of the bracket 112 so as to communicate with an interior of the motor unit 102. The inflow port 125 and the outflow port 126 form an airflow path within the enclosure 121 for the discharged air expelled from the fan unit 103.

A plurality of power devices 127 such as FET's, i.e. components in the inverter circuit unit 131, are mounted integrally with a small radiating fin 128 in a position within a part of the airflow path on the circuit board 122. A casing 120 of the fan unit 103 covers an impeller 118, the air guide 119 and the inverter circuit 131, and it is secured to the bracket 112 by means such as press fitting and bonding.

When the electric blower 101 operates, the impeller 118 rotates to produce a suctioning force. Air in front of the casing 120 flows into the impeller 118 from the suction port 129, and is expelled from an outer periphery of the impeller 118. A flow of the air expelled from the impeller 118 is led to the inflow port 125 in the circuit board enclosure 121, while being decelerated along the airflow path formed by the air guide 119 and an interior surface of the casing 120, and its pressure is recovered. The flow of air entered through the inflow port 125 into the circuit board enclosure 121 passes the airflow path, and travels toward the cooling air outflow port 126. It then cools the heat-generating bodies in the vicinity of the airflow path. The flow of air expelled from the outflow port 126 is discharged further from the discharge port 130 to the outside of the motor unit 102 after passing through the interior of the motor unit 102. The heat-generating parts such as the magnet 132, the core 114, the stator winding 115, and the like are cooled at this time.

As described above, the flow of air expelled by the fan unit 103 cools the power devices 127 on the circuit board 122 before it passes through the heat-generating parts of the motor unit 102. In other words, the power devices 127 on the circuit board 122 can be cooled efficiently by the air of relatively low temperature with a large volume. Therefore, the radiating fin 128 can be reduced in size. Further, there are even cases in which the radiating fin can be made unnecessary. As described, this embodiment can realize a reduction in size as well as saving space in the inverter circuit unit 131, and thereby the electric blower 101 can be downsized.

Furthermore, since the casing 120 is formed integrally by fixing it to the bracket 112, no stress is impressed upon the circuit board 120 from outside of the electric blower 101. This improves reliability of the circuit board enclosure 121, and increases the rigidity and strength of the electric blower 101.

In this embodiment, it may be desirable to further provide a cooling fan in another location within the motor unit 102, in order to improve cooling performance. Described hereinafter is one example that is provided with a cooling fan.

Figure 3:
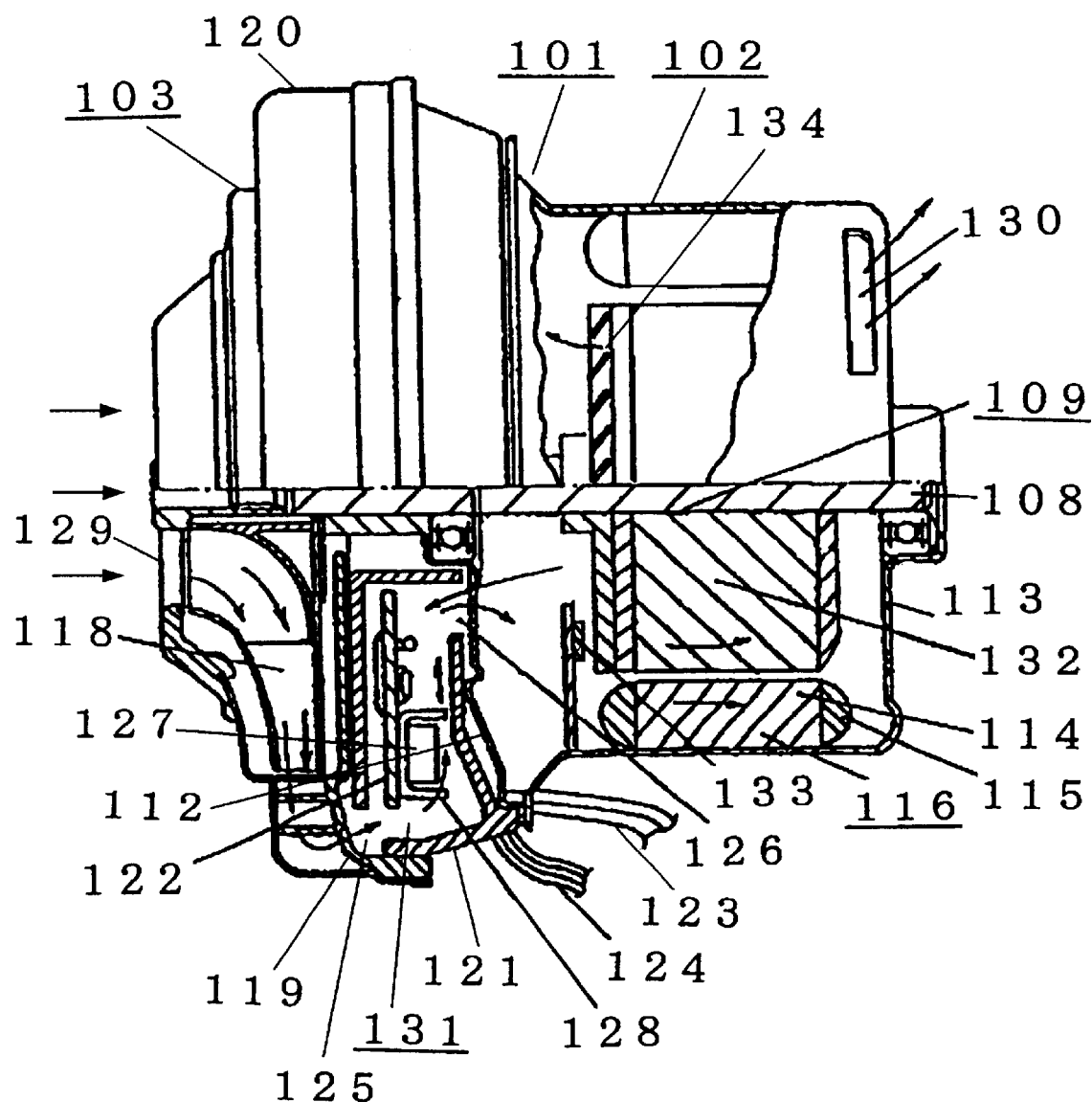
FIG. 3 is a partially sectioned side view of another example of the same electric blower.

FIG. 3 shows an embodiment in which a cooling fan 134 for cooling the inverter circuit unit 131 is provided as a portion of the rotor 109 by means of using an inherent shape of the sheet steel of the rotor 109, or by installing another component made of plastic or the like, for instance. In this case, the cooling fan 134 rotates to produce cooling air as the rotor 109 rotates.

Figure 4:
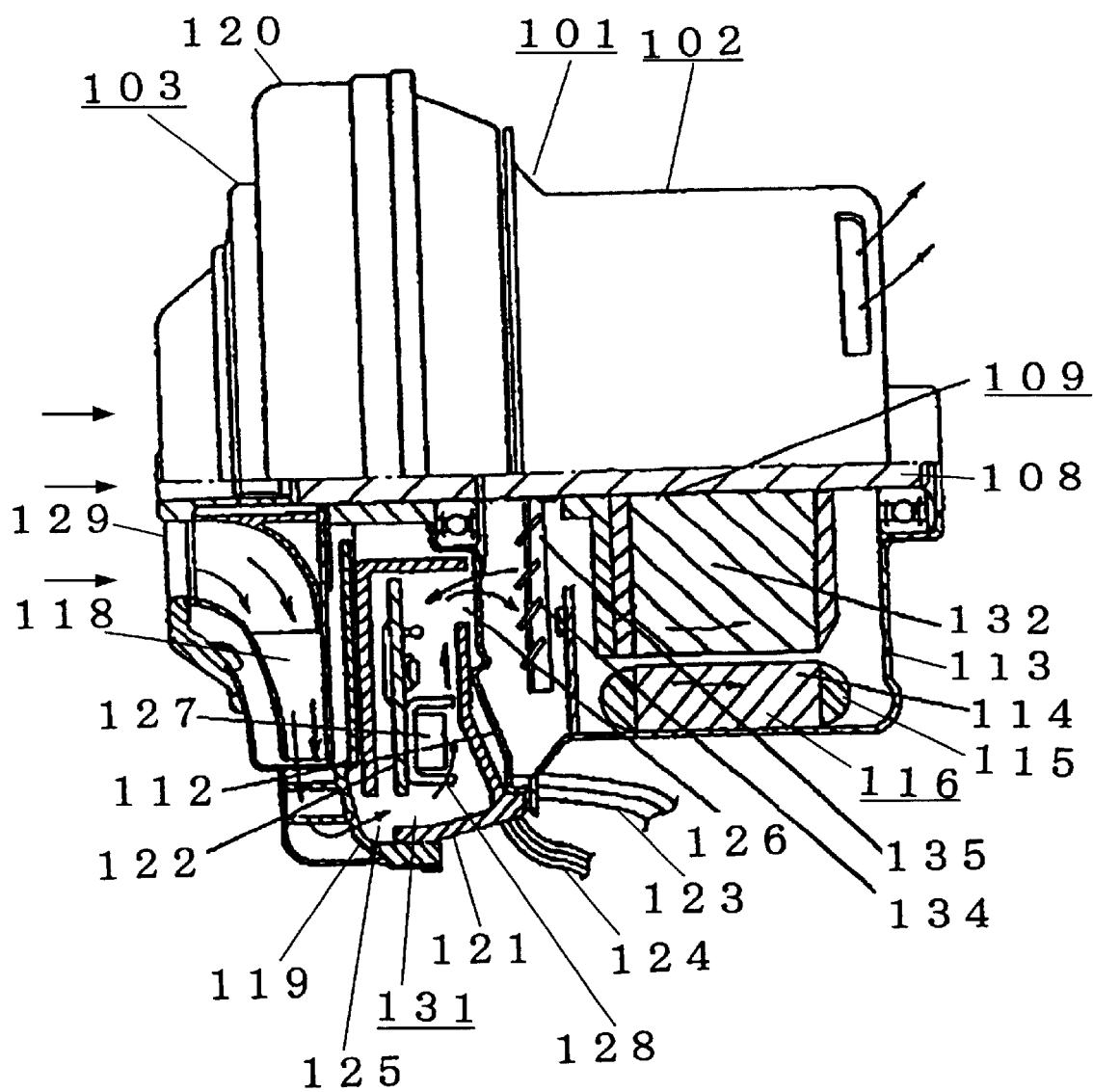
FIG. 4 is a partially sectioned side view of still another example of the same electric blower.

Further, FIG. 4 is another example, in which a magnet for detecting a position of the rotor 109 is provided separately as a sensor magnet 135, and a cooling fan 134 is disposed on this sensor magnet 135, as an alternative of providing the cooling fan 134 as a part of the rotor 109. In this instance, the cooling fan 134 disposed on the sensor magnet 135 generates wind that blows into the inverter circuit unit 131. Hence, the inverter circuit unit 131 can be cooled more efficiently.

Figure 5:
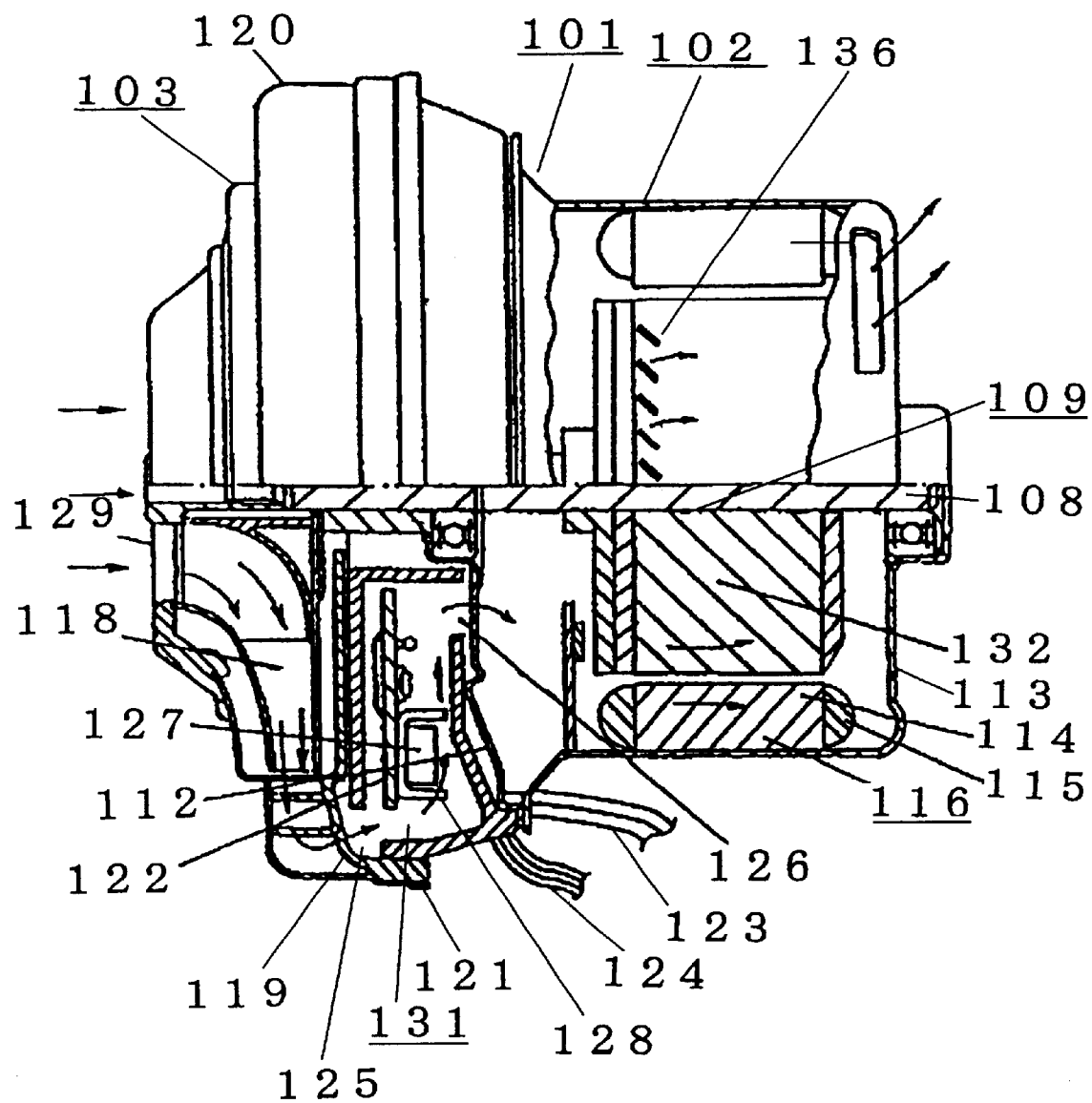
FIG. 5 is a partially sectioned side view of yet another example of the same electric blower.

Or, FIG. 5 is still another example, in which a rotor cooling fan 136 is provided as a portion of the rotor 109 to improve the cooling effect of the rotor 109 itself in the motor unit 102, in addition to cooling of the inverter circuit unit 131. Wind is generated by the rotor cooling fan 136, as the rotor 109 rotates. The wind of the rotor 109 flows over its own body. In this structure, the wind generated by the rotor cooling fan 136 is added to the blowing wind generated by the impeller 118, so as to enable the rotor 109 to cool its own body more effectively. In this case, the wind generated by the rotor cooling fan 136 also flows on the stator 116 wound with the stator winding 115, thereby achieving more efficient cooling.

Third Exemplary Embodiment

A third exemplary embodiment of this invention will be described with reference to FIG. 6. Like reference numerals are used to designate structural components like those of the second exemplary embodiment, and their details will be skipped.

This exemplary embodiment is an example in which dustproof measures are taken for the motor unit 102.

Figure 6:
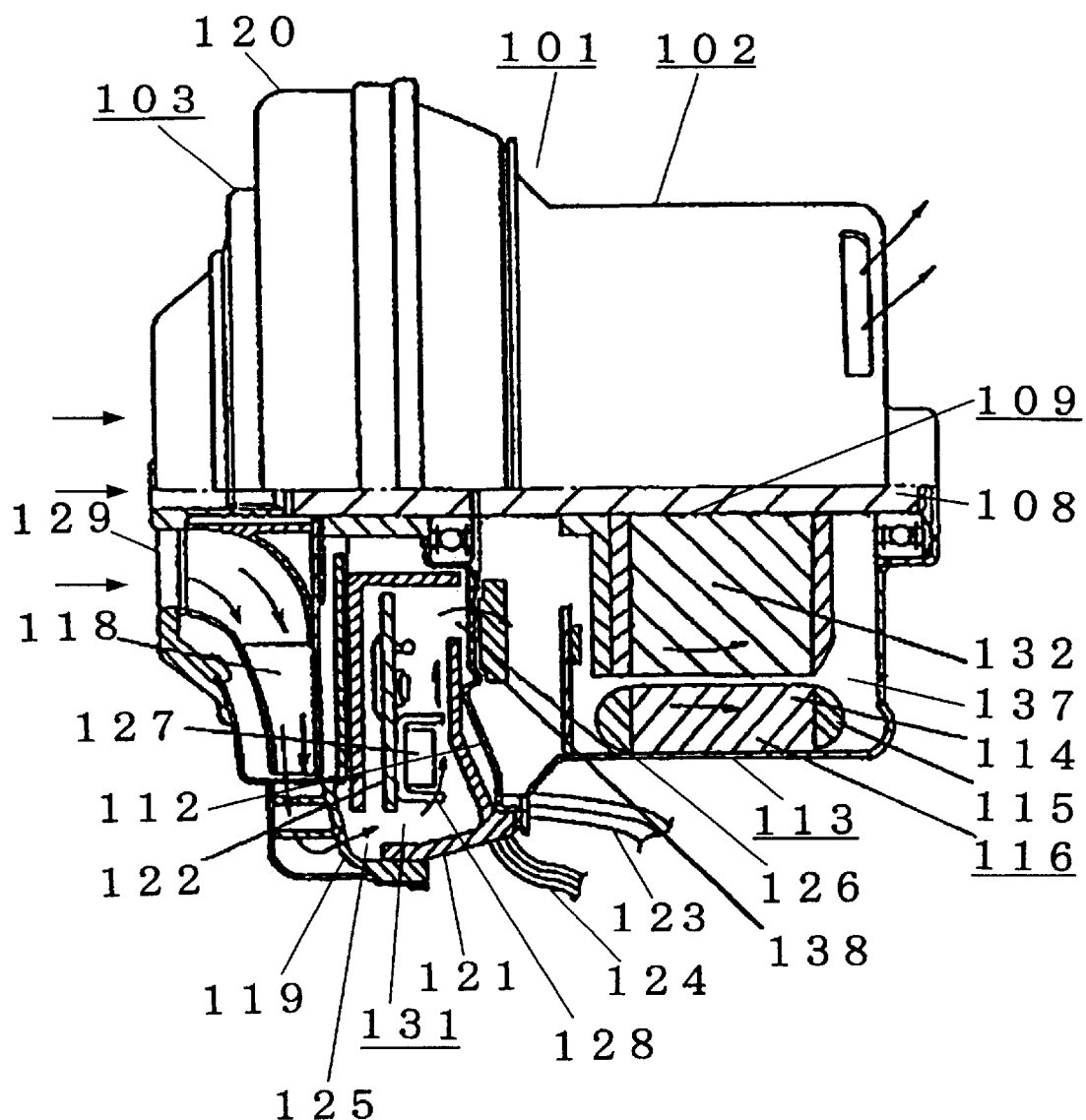
FIG. 6 is a partially sectioned side view of an electric blower of a third exemplary embodiment of the present invention.

An electric blower of this embodiment is provided with a dust filter 138 in a position confronting a cooling air outflow port 126, as shown in FIG. 6, to reduce dust entering the motor unit 102. A gap between the rotor 109 and the stator 116 is set at a distance of 0.47 mm to 0.7 mm. This setting can prevent the rotor 109 and the stator 116 from scraping against each other, or the rotor 109 from being locked due to dust that passes through the filter 138. In addition, efficiency of the motor is not so impaired because the gap set between the rotor 109 and the stator 116 is 0.7 mm or less.

Fourth Exemplary Embodiment

A fourth exemplary embodiment of the present invention will be described hereinafter using FIG. 7 through FIG. 11.

Figure 7:
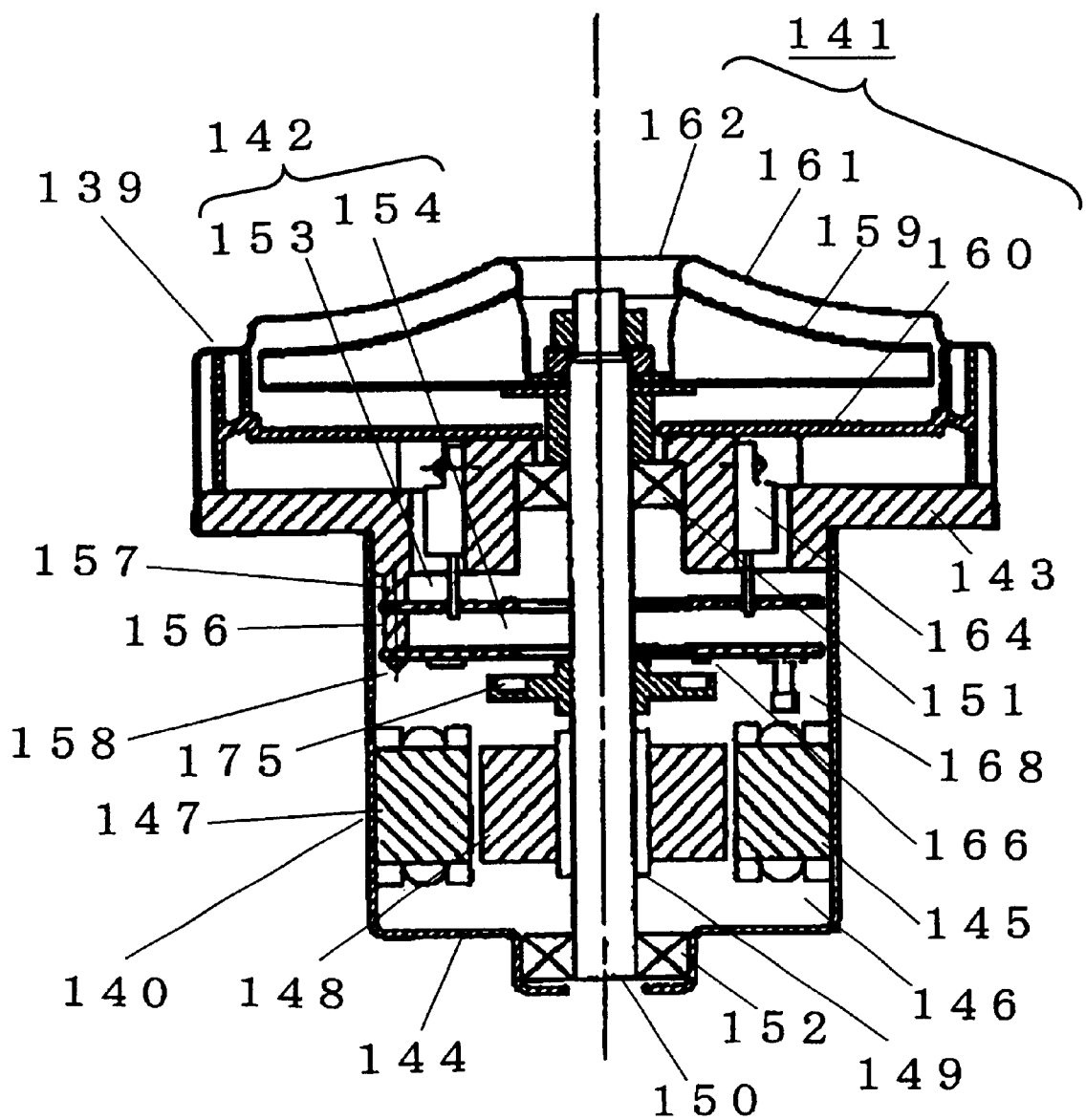
FIG. 7 is a sectioned side view of an electric blower of a fourth exemplary embodiment of the present invention.

An electric blower 139 comprises a motor unit 140, a fan unit 141, and an inverter circuit unit 142 for controlling electric power to the motor unit 140, as shown in FIG. 7.

An enclosure of the motor unit 140 is composed of an impeller-side bracket 143 and a motor-side bracket 144, both made of metal (i.e. conductive material). The bracket 144 is formed into a cylindrical shape with a closed bottom. The bracket 143 is provided with a cylindrical flange, which fits inwardly along a rim of an upper opening of the bracket 144. A stator 147 comprising a core 145 and a winding 146 is fixed in the bracket 144. Further, a rotor 149 bearing a permanent magnet 148 is provided with a shaft 150. The shaft 150 is journaled rotatably in a bearing 151 disposed on an upper part of the bracket 143 and another bearing 152 disposed on a bottom of the bracket 144.

The inverter circuit unit 142 comprises circuit boards 153 and 154. The circuit boards 153 and 154 are circular in shape, which is generally in accord with a shape of the flanged end of the bracket 144. Also, the circuit board 153 and the circuit board 154 are each provided with a center hole 155 in their inner peripheries corresponding to an outer shape of the bearing 151, and their shape resembles a doughnut. The circuit board 153 and the circuit board 154 are spaced apart vertically, and the circuit board 153 is located at a side closer to the bracket 143 than the circuit board 154. The circuit board 153 and the circuit board 154 are placed together with spacers 156 between them, retained with screws 158 to board retaining posts 157 projecting downwardly from the flange of the bracket 143, and covered by the bracket 143 and the bracket 144.

The fan unit 141 is provided with an impeller 159, an air guide 160 and a casing 161. The impeller 159 is attached to an upper end of the shaft 150 of the rotor 149. The air guide 160 is positioned over a periphery of the impeller 159 to form an airflow path that leads a flow of air delivered by the impeller 159 into the motor unit 140 while gradually recovering airflow pressure. The casing 161 is mounted to the bracket 143 so as to cover the air guide 160 and so on. A suction port 162 is formed in an upper surface of the casing 161. Furthermore, the bracket 143 is provided with a plurality of openings 163 for guiding the airflow from the air guide 160 into the motor unit 140.

Figure 8:
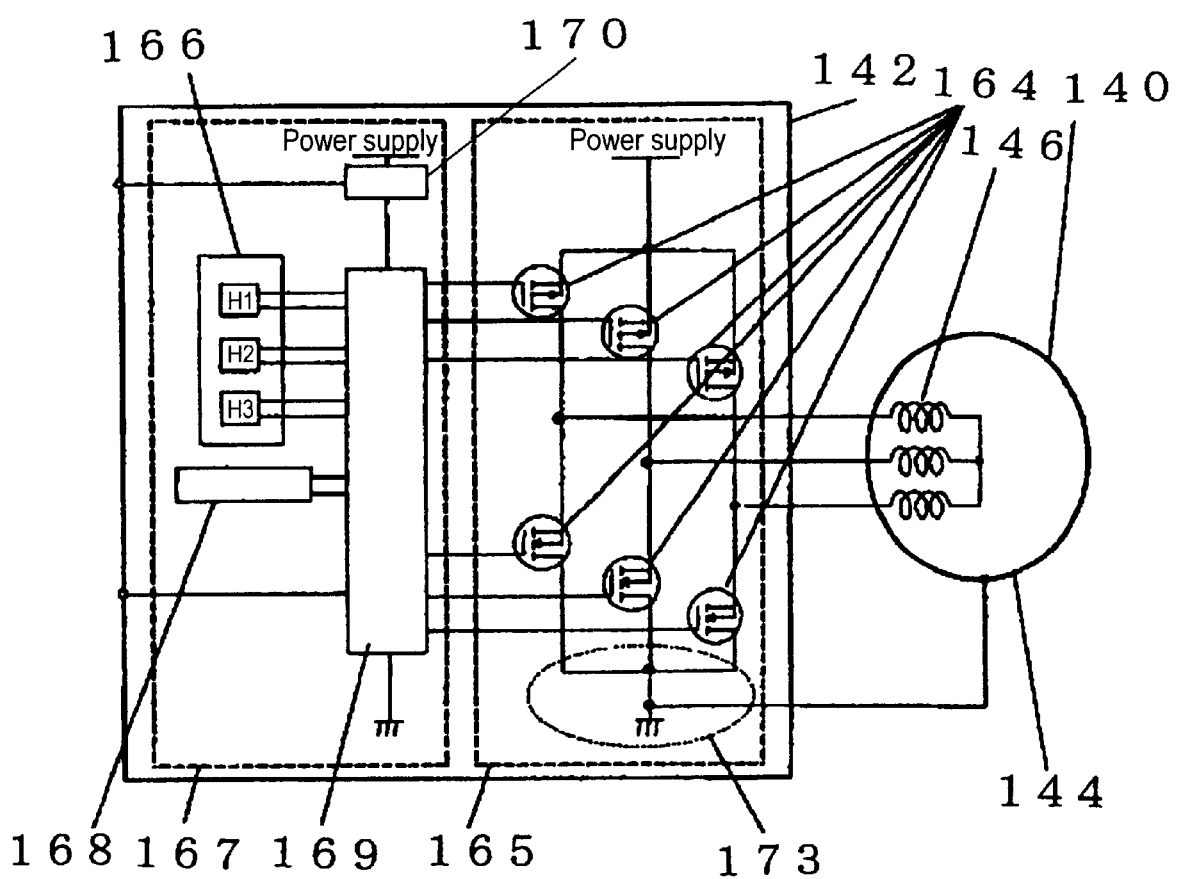
FIG. 8 is a circuit block diagram of the same electric blower.

Referring next to FIG. 8, a configuration of the inverter circuit unit 142 for controlling the motor unit 140 will be described. In this exemplary embodiment, details are given especially for the case in which the motor unit 140 is inverter-driven. The inverter circuit unit 142 is divided into two groups, a power-related circuit 165 dealing with relatively heavy current, including semiconductor switching elements 164 for supplying electric power to individual phases of the winding 146, and a signal-related circuit 167 for processing an output signal from a position detecting element 166 and an operation control signal, and the like from the outside. Circuit components of the power-related circuit 165 are mounted on the circuit board 153. Circuit components of the signal-related circuit 167 are mounted on the circuit board 154.

Furthermore, the signal-related circuit 167 is provided with the position detecting element 166 for detecting the position of the rotor 149 of the motor unit 140, a temperature detecting element 168 for detecting the temperature of the winding 146 of the motor unit 140, and a switch 170 for arbitrarily interrupting electric current supplied to a control IC 169 of the inverter circuit unit 142 in response to an external signal.

Figure 9:
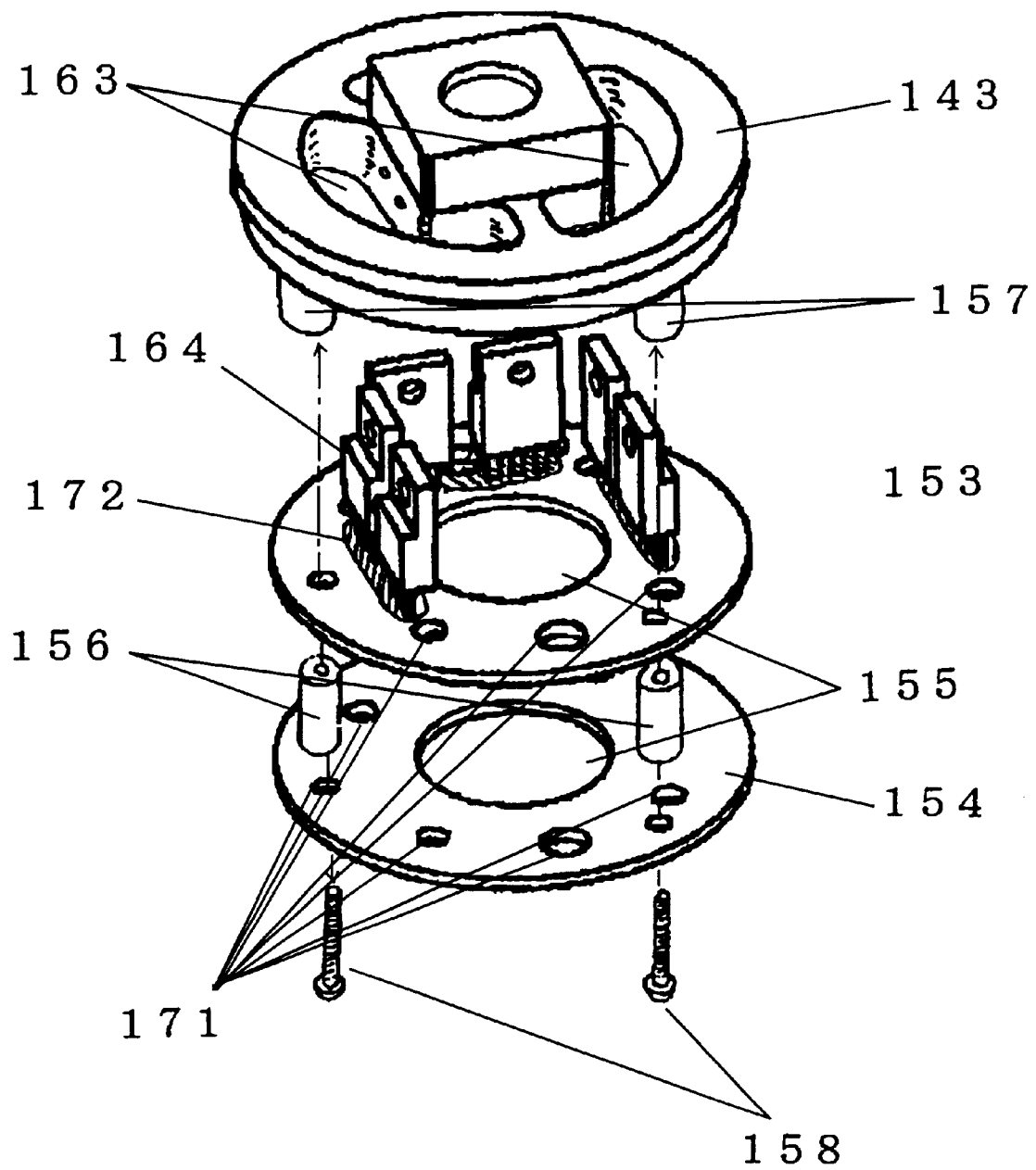
FIG. 9 is an exploded perspective view of an essential portion of the same electric blower.

The circuit boards 153 and 154 are provided with a plurality of through holes 171 that serve as airflow paths for leading the flow of air entering from a side of the impeller-side bracket 143 to an interior of the motor unit 140, as shown in FIG. 7 or FIG. 9. The circuit boards 153 and 154 are coated with molding resin 172 or the like having insulating property over portions where operational malfunction, etc. are apprehensible when foreign particles are caught at solder connections and the like between the circuit boards and the mounted components.

Figure 10:
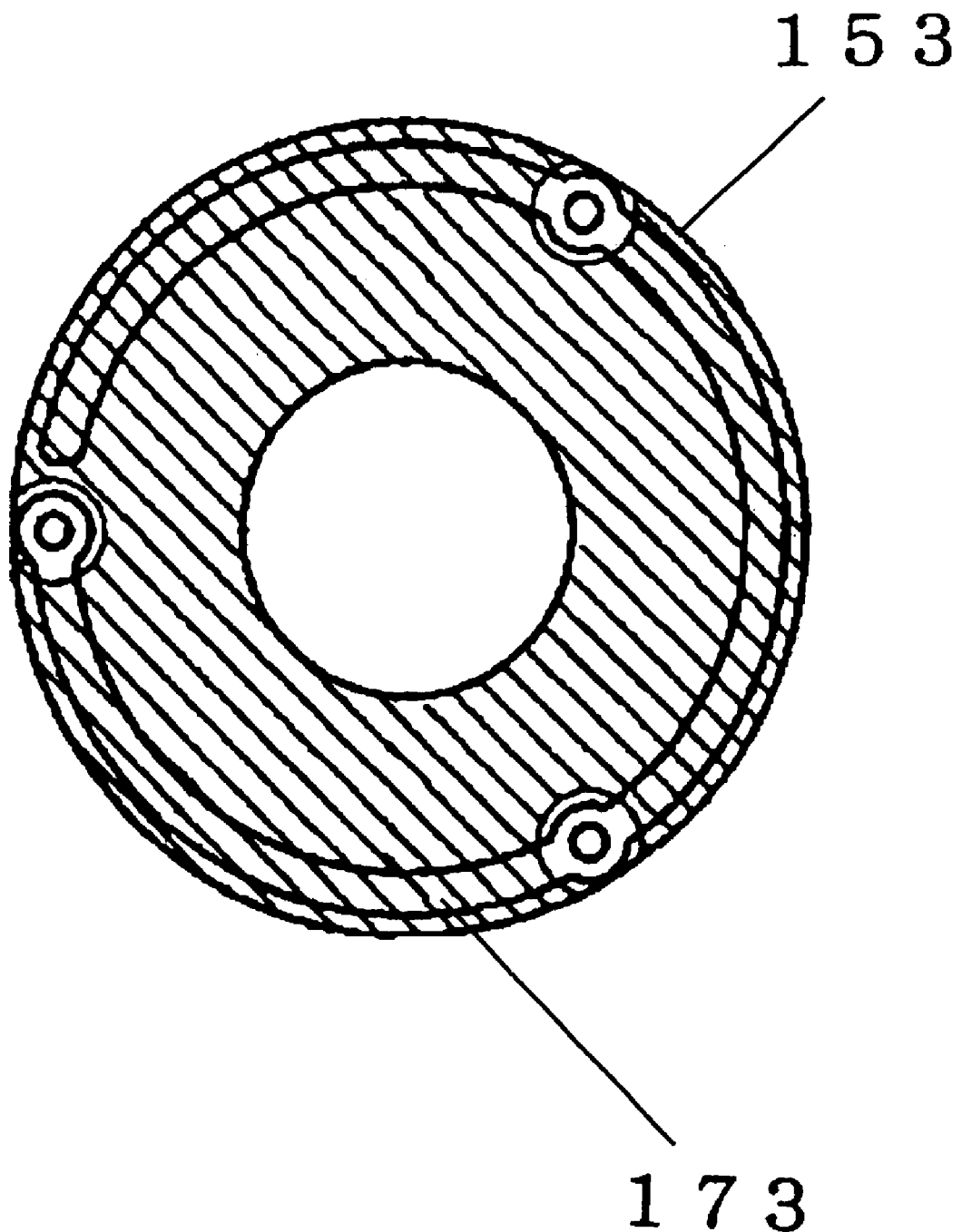
FIG. 10 is a plan view of a circuit board for the same electric blower.

In the circuit configuration shown in FIG. 8 for the inverter motor, a GND pattern 173 (GND represents an abbreviation of ground) is formed along a perimeter of the circuit board to be connected to the GND of the power supply. As shown in FIG. 10, areas around screw holes for fixation are not provided with the insulation treatment, in order to make electrical connections to board fixation screws 158, and to establish an electrical continuity of a part of this GND pattern 173 to the impeller-side bracket 143 or the motor-side bracket 144, made of metal, through any of the screws 158.

Figure 11:
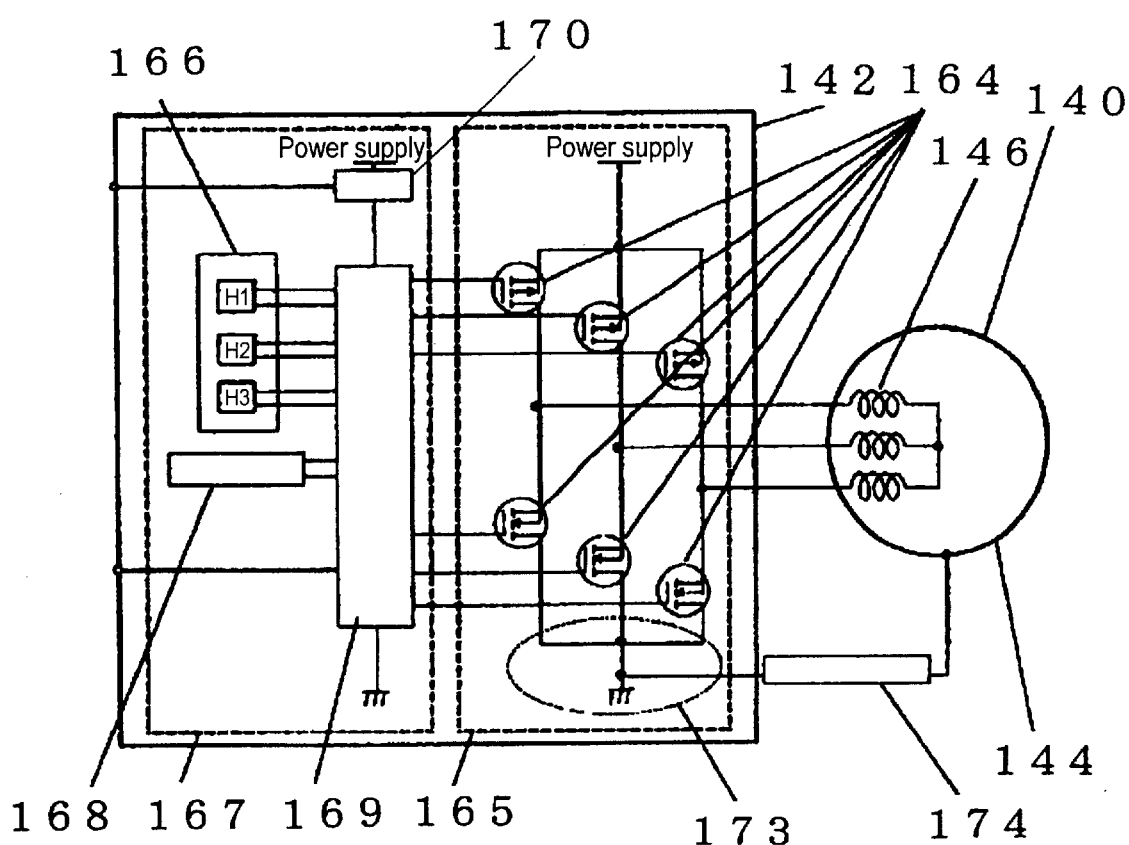
FIG. 11 is a circuit block diagram of another example for the same electric blower.

FIG. 11 is a diagram depicting another circuit configuration of this exemplary embodiment. As shown in FIG. 11, a portion to be connected to the GND of the power supply is connected to the impeller-side bracket 143 or the motor-side bracket 144, made of metal, with a high impedance element 174 or a high impedance resin. Static electricity, etc. built up in the impeller-side bracket 143 and the motor-side bracket 144, made of metal, is discharged through the power supply.

When the electric blower 139 rotates, the impeller 159 rotates to produce a suctioning force. Air flows from the suction port 162 of the casing 161 into the impeller 159, and is expelled from an outer periphery of the impeller 159. A flow of the air expelled from the outer periphery of the impeller 159 reaches to an upper area of the bracket 143, and is led to the circuit boards 153 and 154 through the openings 163.

The inverter circuit unit 142 is adapted for placement within the bracket 144, since it is divided into the circuit board 153 and the circuit board 154. That is, a surface area of the inverter circuit unit 142 can be reduced in a diametral direction, and thereby the electric blower 139 can be constructed within a limited space.

In addition, since the power-related circuit 165 and the signal-related circuit 167 are mounted separately, the signal-related circuit 167 is not likely to receive an influence of noises generated in the power-related circuit 165.

Further, because the circuit board 153 is disposed near the bracket 143, heat generated by the components mounted on the circuit board 153 is conducted to the bracket 143. The heat in the bracket 143 is subsequently dissipated efficiently because a large volume of airflow discharged by the impeller 159 passes through at high velocity. In other words, the impeller-side bracket 143 is used as a radiating fin because the switching elements 164 contact an inner surface of the openings 163 in the bracket 143, as shown in FIG. 9. In this instance, it is desirable that the impeller-side bracket 143 be made of a thermally well conductive metal.

Furthermore, because the position detecting element 166 for the rotor 148 is mounted on the circuit board 154, the signal-related circuit 167 can be consolidated to deal with a small current and signals, thereby saving space in the inverter circuit unit 142. In addition, since the temperature detecting element 168 can be placed near the winding 146 as it is mounted on the circuit board 154, temperature of the winding 146 can be detected sensitively and accurately. As a result, protection control of the inverter motor unit 140 can be achieved reliably.

Moreover, the impeller-side bracket 143 and the motor-side bracket 144, made of metal, are constructed to have a shielding effect of the circuit unit 142 to the external devices. That is, adverse effects to the external devices due to the noises generated by the inverter circuit unit 142 are alleviated.

The air discharged from the outer periphery of the impeller 159 flows into the motor unit 140 through the plurality of through holes 171. Therefore, the winding 146 and the like of the motor unit 140 are efficiently cooled.

Further, reliability can be improved by using the molding resin 172, etc. to cover portions where dust collecting on the component mounting surface of the inverter circuit unit 142 may lead to trouble.

Because the GND pattern 173 is provided along the outer perimeter of the circuit board of the inverter circuit unit 142, static electricity in the metallic brackets tends to flow readily to the GND pattern 173, so that breakdown of the circuits can be alleviated. Dielectric strength to the static electricity is also improved owing to the short-circuiting either directly or through the high impedance element 174 or a high impedance resin between the GND pattern 173 and the impeller-side bracket 143 or the motor-side bracket 144 of metal. In this exemplary embodiment, although both the impeller-side bracket 143 and the motor-side bracket 144 are fabricated of metal so as to be electrically conductive material, it may be acceptable to fabricate at least one of the impeller-side bracket 143 and the motor-side bracket 144 with conductive material. Effects similar to those described above can be achieved if only one bracket made of the conductive material is short-circuited with the GND pattern 173 directly or through the high impedance element 174 or the high impedance resin.

Furthermore, a reduction of power consumption, and therefore conservation of energy, can be realized by disconnecting the power supply to the inverter circuit unit 142 with the switch 170 when a signal signifying "stop" is input to the circuit unit 142 from the cleaner equipped with the electric blower of this exemplary embodiment.

Fifth Exemplary Embodiment

A fifth exemplary embodiment of the present invention will be described next by referring to FIG. 12. Since the basic structure is generally similar to that of the fourth exemplary embodiment except for the air guide, the description will be skipped, and details will be given mainly for the different points. In addition, like numerals are used to designate like structural components.

Figure 12:
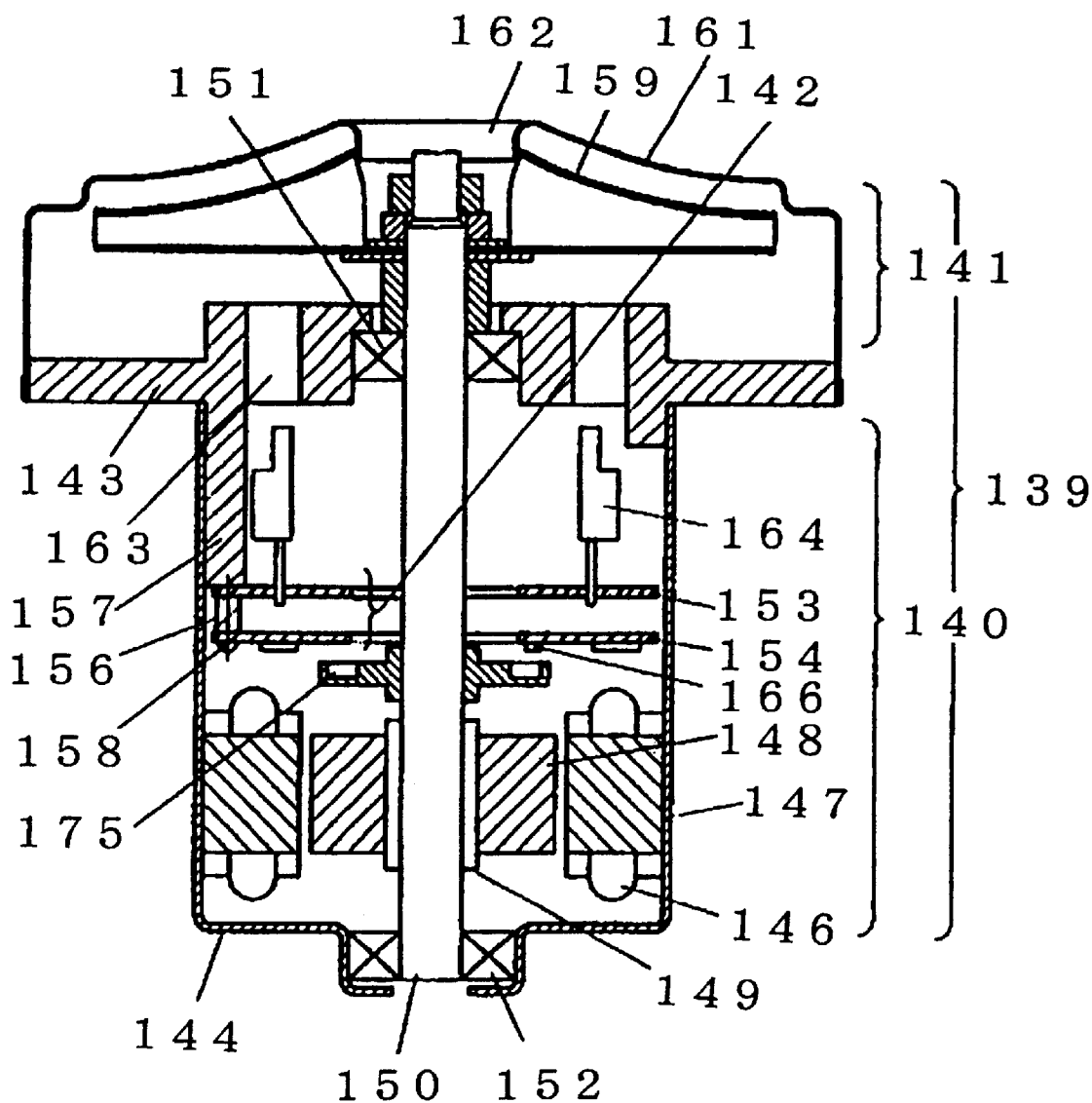
FIG. 12 is a sectioned side view of an electric blower of a fifth exemplary embodiment of the present invention.

An electric blower 139 comprises a motor unit 140, a fan unit 141 driven rotatively by the motor unit 140, and an inverter circuit unit 142 for controlling the motor unit 140, as shown in FIG. 12. In this exemplary embodiment, the inverter circuit unit 142 is divided into a circuit board 153 and another circuit board 154. A plurality of switching elements 164 of large heating value are mounted on the circuit board 153, and are arranged at a side facing the impeller-side bracket 143 in such an orientation that their longitudinal sides are generally perpendicular to the circuit board 153.

When electric power is supplied to the electric blower 139, an impeller 159 rotates to produce a suctioning force. Air in front of a casing 161 flows from a suction port 162 into the impeller 159, and is expelled from an outer periphery of the impeller 159. The air expelled from the outer periphery of the impeller 159 reaches an upper area of the impeller-side bracket 143 of the inverter motor, and is led to the circuit board 153 and the circuit board 154 of the inverter circuit unit 142 through openings 163 in the impeller-side bracket 143. The switching elements 164 and the like are cooled during this period. Although the switching elements 164 require the largest amount of space on the circuit board, a surface area of the circuit board can be reduced, since the switching elements are mounted in a direction that is generally perpendicular to the circuit board 153. Accordingly, an outer diameter of the motor-side bracket 144 of the motor unit 140 can be reduced.

Sixth Exemplary Embodiment

A sixth exemplary embodiment of the present invention will be described hereinafter by referring to FIG. 13. Since the basic structure is generally similar to that of the fifth exemplary embodiment, the description will be skipped, and details will be given mainly for the different points. In addition, like numerals are used to designate like structural components.

Figure 13:
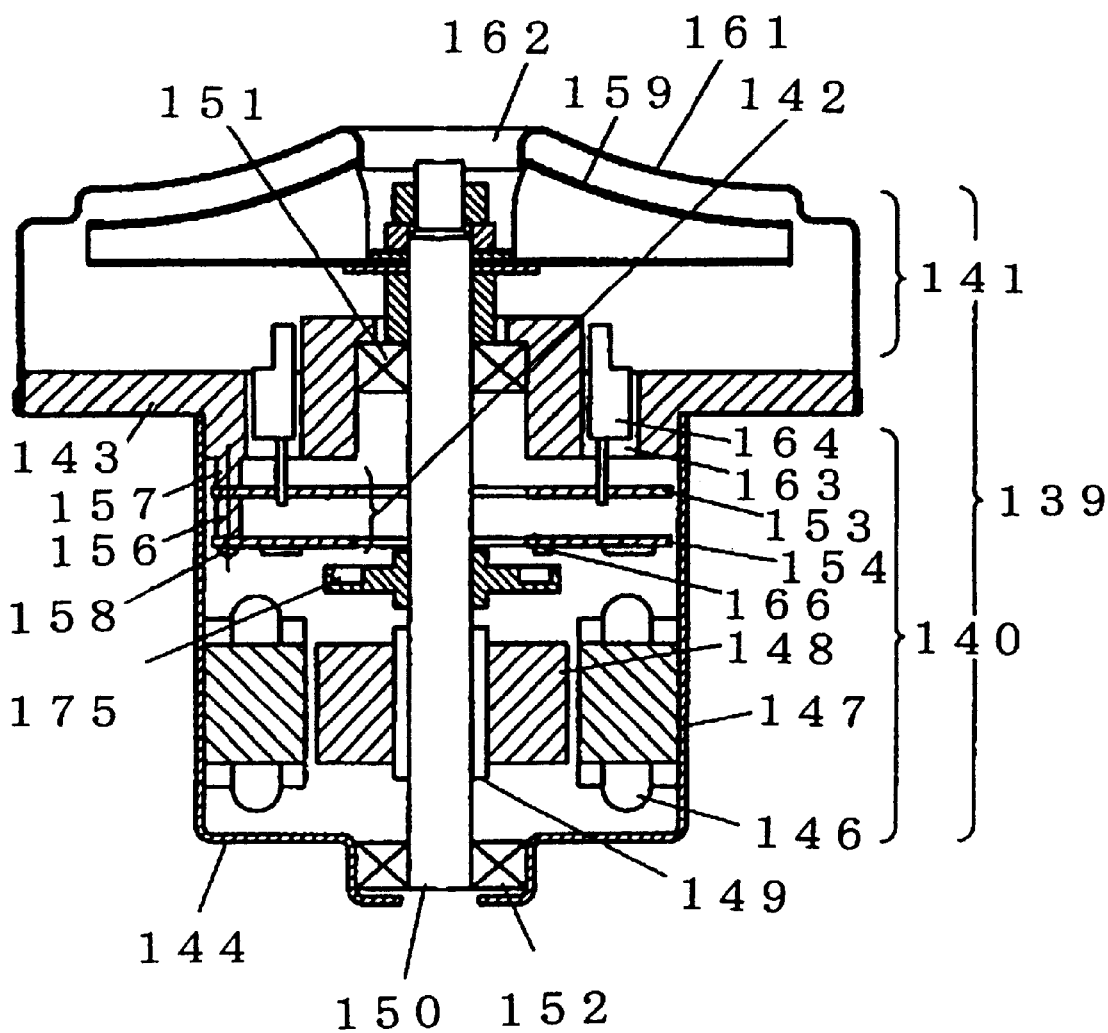
FIG. 13 is a sectioned side view of an electric blower of a sixth exemplary embodiment of the present invention.

An inverter circuit unit 142 is disposed in a space formed between an impeller-side bracket 143, and a rotor 149 and a stator 147, as shown in FIG. 13. A plurality of switching elements 164 for switching purpose are mounted on a circuit board 153 and arranged at a side facing the impeller-side bracket 143 in an orientation so that their longitudinal sides are generally perpendicular to the circuit board, and in positions within openings 163 in the impeller-side bracket 143.

The foregoing structure operates in a manner which is described hereinafter.

When electric power is supplied to an electric blower 139, an impeller 159 rotates to produce a suctioning force. Air in front of a casing 161 flows from a suction port 162 into the impeller 159, and is expelled from an outer periphery of the impeller 159. The air expelled from the outer periphery of the impeller 159 reaches an upper area of the impeller-side bracket 143, and is led toward the circuit board 153 and another circuit board 154 of the inverter circuit unit 142 through the openings 163 in the impeller-side bracket 143. The switching elements 164 and the like are cooled during this period. As described, since the switching elements 164 are positioned within the openings 163 in the impeller-side bracket 143, a dimension of the motor unit 140 in its axial direction can be shortened. At the same time, cooling efficiency of the switching elements 164 improves, since the openings 163 become smaller than the surroundings, which increases the flow velocity.

Seventh Exemplary Embodiment

A seventh exemplary embodiment of this invention will be described by referring to FIG. 14. Since the basic structure is generally similar to that of the fifth exemplary embodiment, the description will be skipped, and details will be given mainly for the different points. In addition, like numerals are used to designate like structural components.

Figure 14:
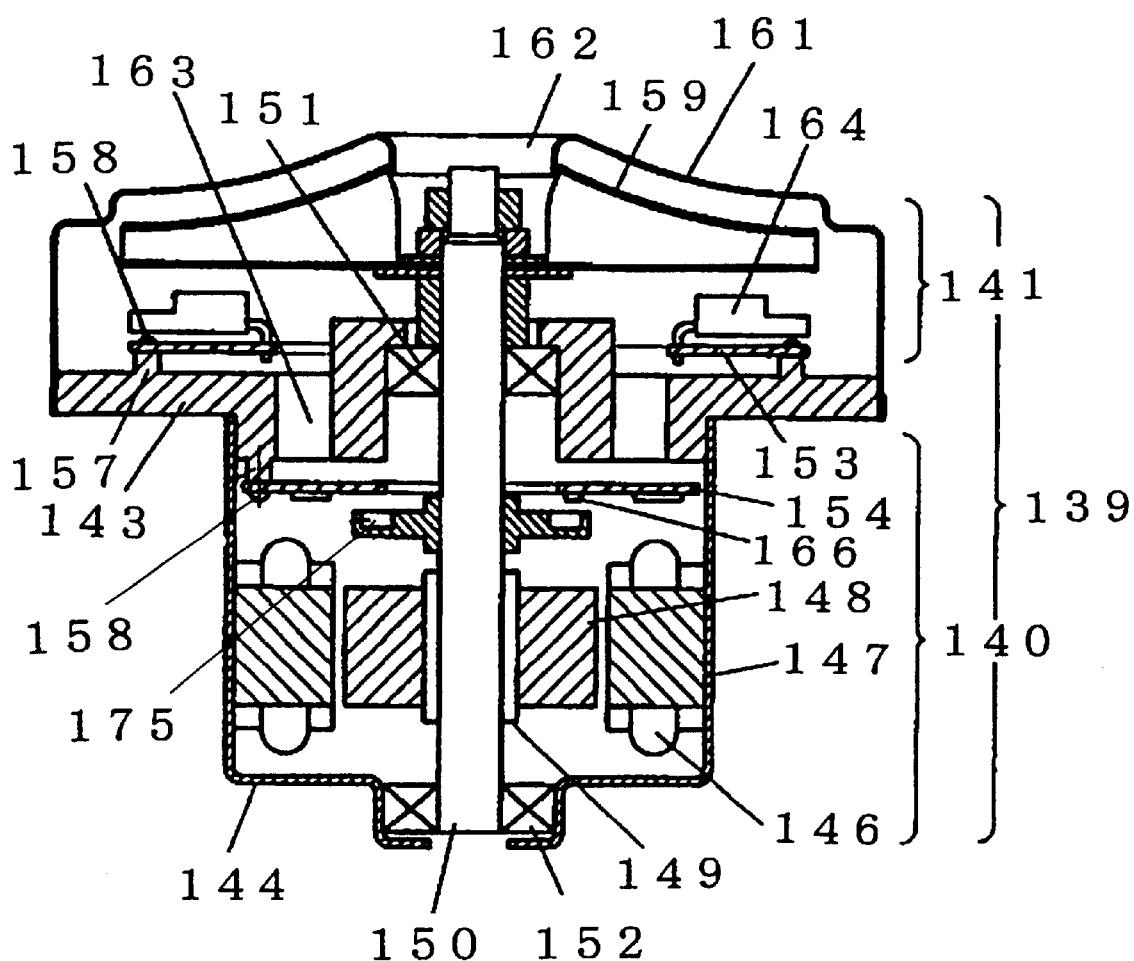
FIG. 14 is a sectioned side view of an electric blower of a seventh exemplary embodiment of the present invention.

A circuit board 154 of an inverter circuit unit 142 is disposed in a space formed between an impeller-side bracket 143, and a rotor 149 and a stator 147, as shown in FIG. 14. A circuit board 153 of the inverter circuit unit 142 is disposed in a space formed between an impeller 159 and the impeller-side bracket 143. The circuit board 153 and the circuit board 154 are retained respectively by board retaining posts 157 of the impeller-side bracket 143 with circuit board fixation screws 158. A position detecting element 166 for detecting a rotor position is mounted on the circuit board 154. A plurality of switching elements 164 for switching purpose are mounted on the circuit board 153 in such an orientation that their longitudinal sides are generally parallel with the circuit board 153.

When electric power is supplied to the electric blower 139, the impeller 159 rotates to produce a suctioning force. Air in front of a casing 161 flows from a suction port 162 into the impeller 159, and is expelled from an outer periphery of the impeller 159. The air expelled from the outer periphery of the impeller 159 passes through the circuit board 153, and is led to the circuit board 154 after passing through openings 163 in the bracket 143.

In this exemplary embodiment, only a small height is needed for a space above the circuit board 153, because the plurality of switching elements 164 are mounted generally parallel to the circuit board. Accordingly, an overall length of the entire electric blower 139 can be reduced. In addition, cooling efficiency of the switching elements 164 is favorable, since they are disposed in an airflow path of the air generated by the impeller 159.

Eighth Exemplary Embodiment

An eighth exemplary embodiment of the present invention will be described next by referring to FIG. 15. Since the basic structure is generally similar to that of the fifth exemplary embodiment, the description will be skipped, and details will be given mainly for the different points. In addition, like numerals are used to designate like structural components.

Figure 15:
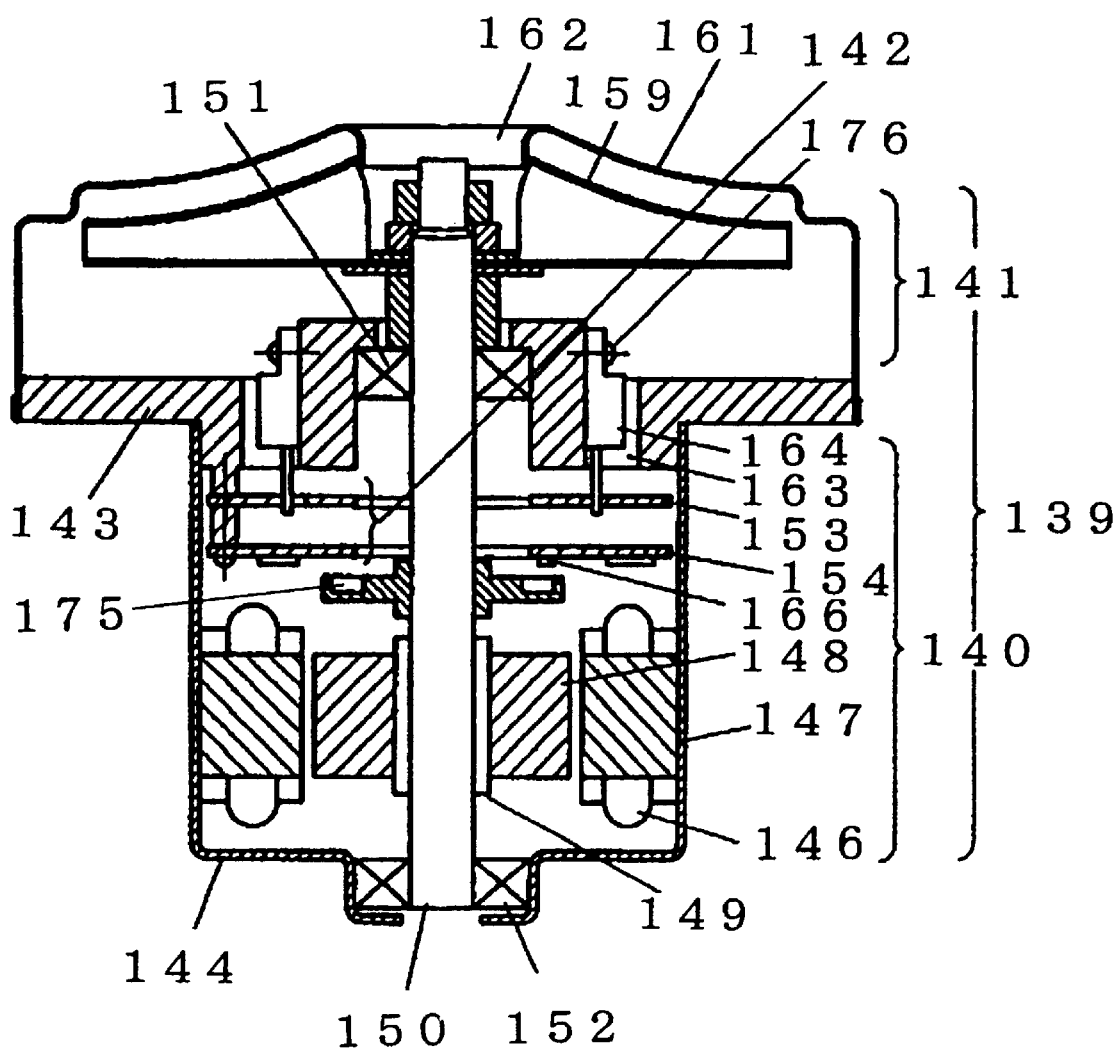
FIG. 15 is a sectioned side view of an electric blower of an eighth exemplary embodiment of the present invention.

As shown in FIG. 15, an inverter circuit unit 142 for driving an electric blower 139 is built within a motor unit 140.

A circuit board 153 and another circuit board 154 constituting the inverter circuit unit 142 are disposed in a space formed between an impeller-side bracket 143 made of metal, and a rotor 149 and a stator 147. A plurality of switching elements 164 for switching purpose are mounted on the circuit board 153 and arranged on the impeller-side bracket 143 in such an orientation that their longitudinal sides are generally perpendicular to the circuit board. An upper side of each switching element 164 is fixed with a screw 176 so that it is in contact with an inner surface of an opening formed in the impeller-side bracket 143.

The foregoing structure operates in a manner as described hereinafter.

When electric power is supplied to the electric blower 139, an impeller 159 rotates to produce a suctioning force. Air in front of a casing 161 flows from a suction port 162 into the impeller 159, and is expelled from an outer periphery of the impeller 159. The air expelled from the outer periphery of the impeller 159 is led toward the circuit board 153 and another circuit board 154 of the inverter circuit unit 142 through openings 163 in the bracket 143.

The plurality of switching elements 164 mounted on the circuit board 153 are cooled efficiently during this period, since the flow of air discharged by the impeller 159 passes through in large volume and at high velocity. In addition, since the switching elements 164 in this embodiment are fixed in contact with the metallic impeller-side bracket 143, the bracket 143 plays a role of the radiating fin. Also, because the impeller-side bracket 143 is totally exposed to the flow of discharged air from the impeller 159, a further cooling effect is attainable.

As the switching elements 164 of the inverter circuit unit 142 are fixed in contact with the bracket 143, the impeller-side bracket 143 serves as the radiating fin. Hence, the further cooling effect is obtained.

Ninth Exemplary Embodiment

A ninth exemplary embodiment of the present invention will be described next by referring to FIG. 16. Since the basic structure is generally similar to that of the fifth exemplary embodiment, the description will be skipped, and details will be given mainly for the different points. In addition, like numerals are used to designate like structural components.

Figure 16:
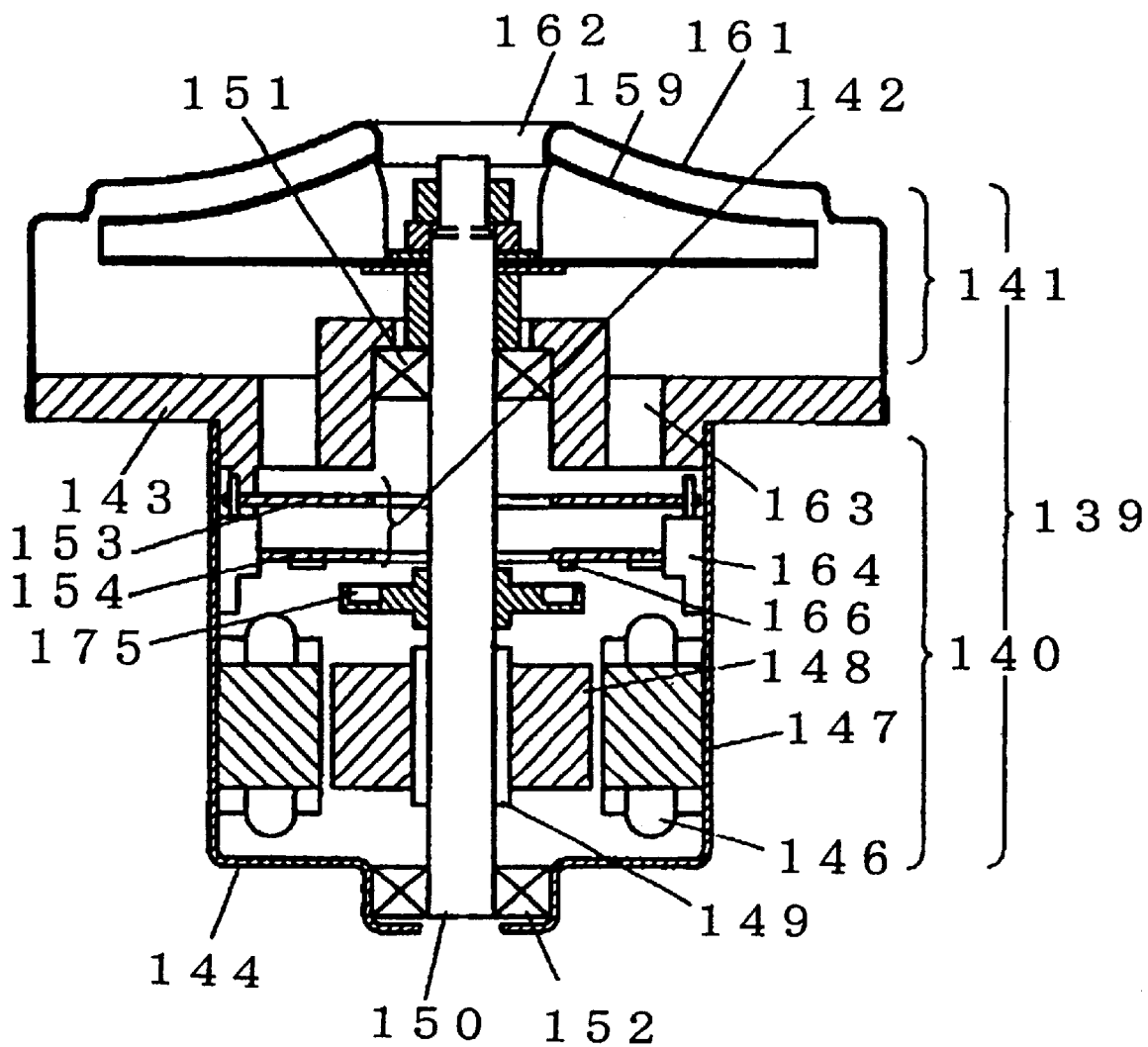
FIG. 16 is a sectioned side view of an electric blower of a ninth exemplary embodiment of the present invention.

As shown in FIG. 16, an inverter circuit unit 142 for driving an electric blower 139 is built within a motor unit 140.

A plurality of switching elements 164 are mounted on a circuit board 153 in such an orientation that their longitudinal sides are generally perpendicular to the circuit board. The switching elements 164 are fixed with adhesive or a similar substance having good thermal conductivity so that they are in contact with a motor-side bracket 144 made of metal.

When electric power is supplied to the electric blower 139, an impeller 159 rotates to produce a suctioning force. Air in front of a casing 161 flows from a suction port 162 into the impeller 159, and is expelled from an outer periphery of the impeller 159. The air expelled from the outer periphery of the impeller 159 is led toward the circuit board 153 and another circuit board 154 through openings 163 in an impeller-side bracket 143.

The plurality of switching elements 164 are cooled efficiently during this period, since the flow of air discharged by the impeller 159 passes through in large volume and at high velocity. Since the switching elements 164 in this embodiment are fixed in contact with the metallic motor-side bracket 144, the motor-side bracket 144 acts as a radiating fin. Also, because the motor-side bracket 144 is totally exposed to the flow of discharged air from the impeller 159, a further cooling effect is attainable. In addition, the motor-side bracket 144 provides for a greater cooling effect, because it has a larger radiating area than the impeller-side bracket 143.

In the foregoing fourth and fifth exemplary embodiment, although both the impeller-side bracket 143 and the motor-side bracket 144 are described as being fabricated of metal, one of the impeller-side bracket 143 and the motor-side bracket 144 may be fabricated of electrically conductive material. The metallic material can provide a good thermal conductivity that increases the effectiveness of thermal dissipation. Besides, it is also possible, if necessary, to select a material having good thermal conductivity other than metallic material.

Tenth Exemplary Embodiment

A tenth exemplary embodiment of this invention will be described now by referring to FIG. 17. Since a basic structure is generally similar to that of the fifth exemplary embodiment, their description will be skipped, and details will be given mainly for the different points. In addition, like numerals are used to designate like structural components.

Figure 17:
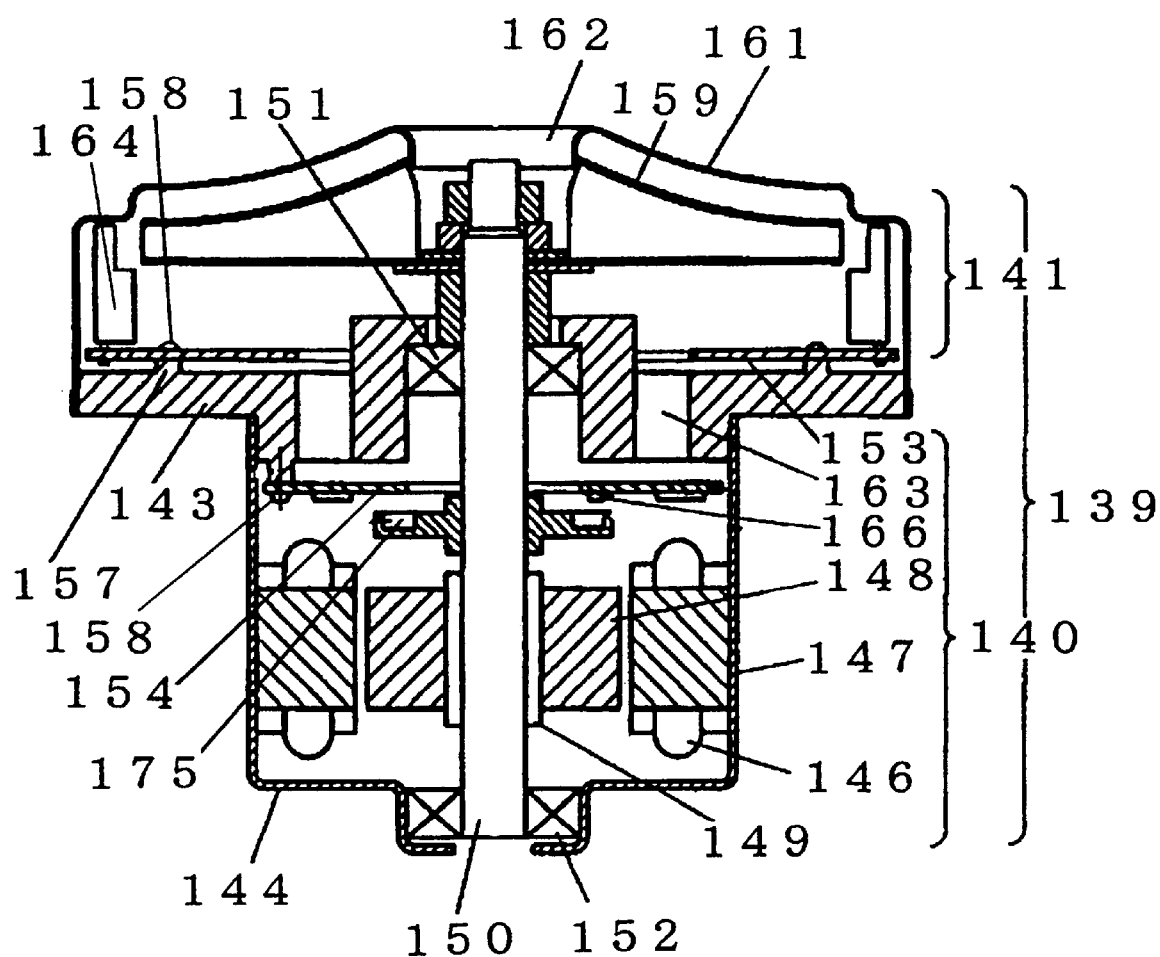
FIG. 17 is a sectioned side view of an electric blower of a tenth exemplary embodiment of the present invention.

A circuit board 154 constituting an inverter circuit unit 142 is disposed in a space formed between an impeller-side bracket 143, and a rotor 149 and a stator 147, as shown in FIG. 17. A circuit board 153 is disposed in a space formed between an impeller 159 and the bracket 143. The circuit board 153 and the circuit board 154 are retained by board retaining posts 157 formed respectively on a front side and a backside of the bracket 143, using screws 158. A position detecting element 166 for detecting a rotor position is mounted on the circuit board 154. A plurality of switching elements 164 are mounted on the circuit board 153 so that they are located along an outer periphery of the impeller 159.

When electric power is supplied to an electric blower 139, the impeller 159 rotates to produce a suctioning force. Air in front of a casing 161 flows from a suction port 162 into the impeller 159, and is expelled from an outer periphery of the impeller 159. The air expelled from the outer periphery of the impeller 159 passes through the circuit board 153, and is led to the circuit board 154 through openings 163 in the bracket 143.

Since the plurality of switching elements 164 are mounted so as to be located along the outer periphery of the impeller 159, the flow of air generated by the impeller 159 flows directly on the switching elements 164. Therefore, the switching elements 164 are effectively cooled by the high-velocity flow of air.

Eleventh Exemplary Embodiment

An eleventh exemplary embodiment of this invention will be described next by referring to FIG. 18. Since the basic structure is generally similar to that of the fifth exemplary embodiment, the description will be skipped, and details will be given mainly for the different points. In addition, like numerals are used to designate like structural components.

Figure 18:
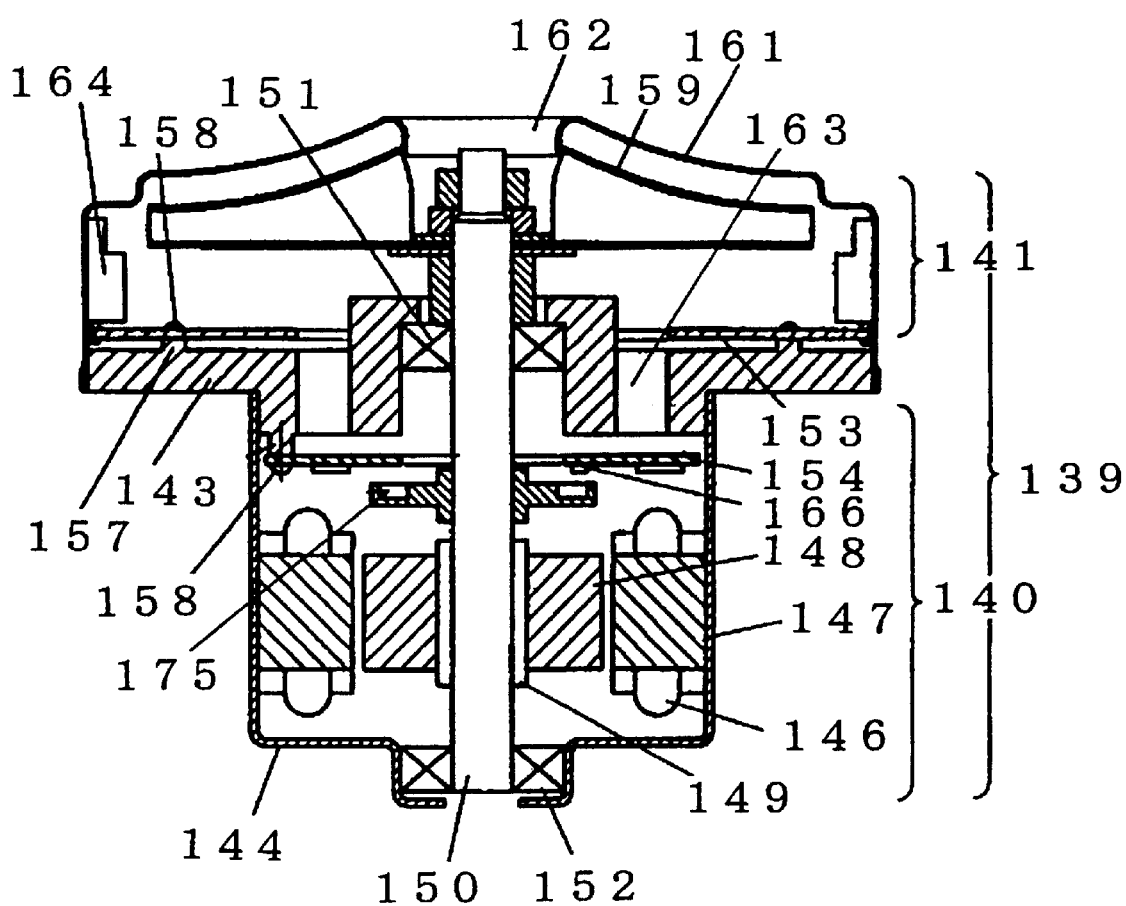
FIG. 18 is a sectioned side view of an electric blower of an eleventh exemplary embodiment of the present invention.

A circuit board 154 constituting an inverter circuit unit 142 is disposed in a space formed between an impeller-side bracket 143, and a rotor 149 and a stator 147, as shown in FIG. 18. A circuit board 153 is disposed in a space formed between an impeller 159 and the bracket 143. The circuit board 153 and the circuit board 154 are retained by board retaining posts 157 formed respectively on a front side and a backside of the bracket 143 using screws 158. A position detecting element 166 for detecting a rotor position is mounted on the circuit board 154. A plurality of switching elements 164 are mounted on the circuit board 153 so that they are located along an outer periphery of the impeller 159, and are fixed to a casing 161 made of metal with adhesive or a similar substance having good thermal conductivity.

When electric power is supplied to an electric blower 139, the impeller 159 rotates to produce a suctioning force. Air in front of the casing 161 flows from a suction port 162 into the impeller 159, and is expelled from an outer periphery of the impeller 159. The air expelled from the outer periphery of the impeller 159 passes through the circuit board 153, and is led to the circuit board 154 after passing through openings 163 in the bracket 143.

Since the plurality of switching elements 164 are mounted so as to be located along the outer periphery of the impeller 159, the flow of air generated by the impeller 159 flows directly on the switching elements 164, thereby cooling effectively by a high-velocity, strong flow of the air. Further, since the switching elements 164 are fixed in contact with the casing 161, the casing 161 acts as a radiating fin to increase the cooling effect.

In this embodiment, although the casing 161 is made of metal, it is also acceptable to select any other material of good thermal conductivity.

Twelfth Exemplary Embodiment

A twelfth exemplary embodiment of this invention will be described now by referring to FIG. 19. Since the basic structure is generally similar to that of the fourth exemplary embodiment, the description will be skipped, and details will be given mainly for the different points. In addition, like numerals are used to designate like structural components.

Figure 19:
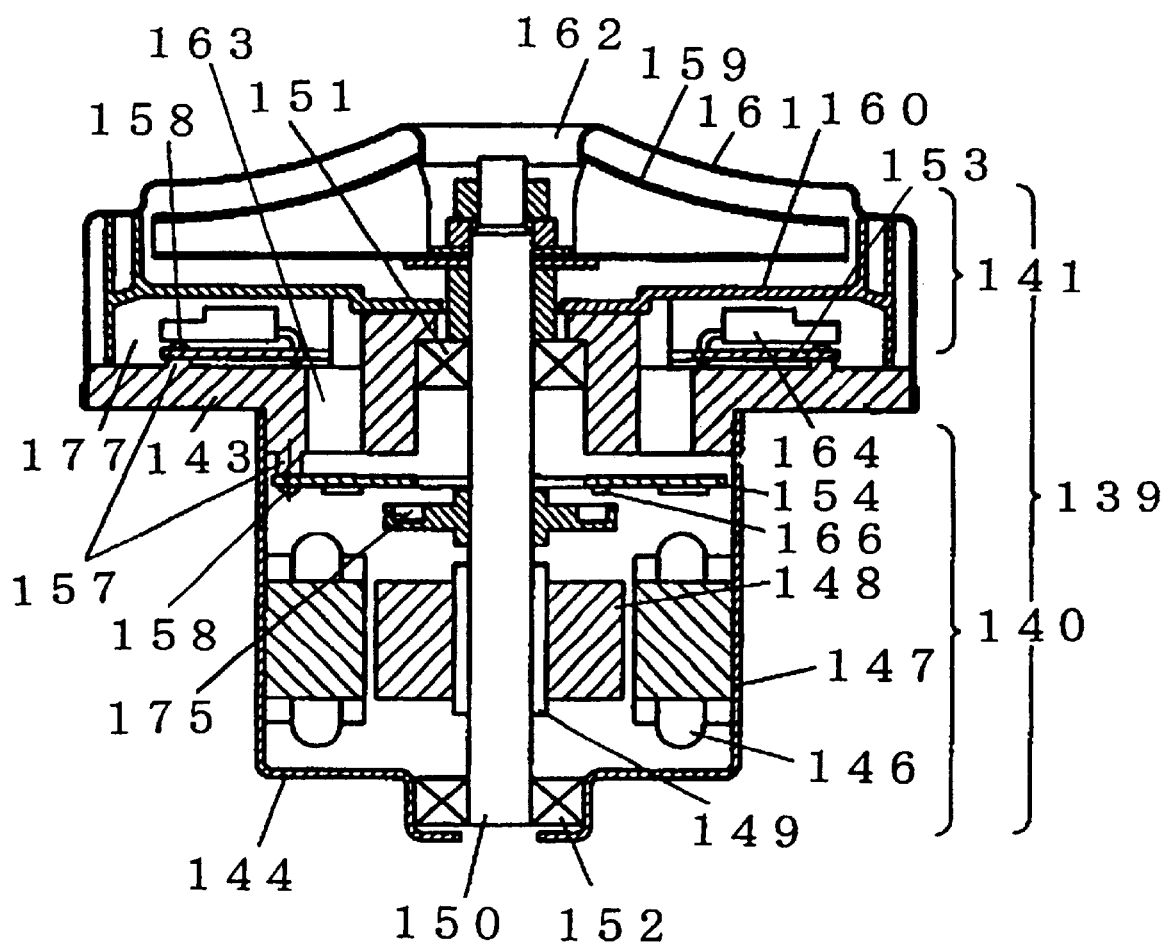
FIG. 19 is a sectioned side view of an electric blower of a twelfth exemplary embodiment of the present invention.

As shown in FIG. 19, a fan unit 141 is provided with an air guide 160 along a periphery and below an impeller 159 for rectifying an airflow generated by the impeller 159, and for recovering air pressure (dynamic pressure-to-static pressure conversion). A return path 177 is provided on a surface of the air guide 160 at a side facing an impeller-side bracket 143, for guiding the flow of air to a motor unit 140. A circuit board 154 constituting an inverter circuit unit 142 is disposed between the impeller-side bracket 143, and a rotor 149 and a stator 147, and another circuit board 153 is disposed between the air guide 160 and the impeller-side bracket 143. The circuit board 153 and the circuit board 154 are retained by board retaining posts 157 formed respectively on a front side and a backside of the impeller-side bracket 143 using screws 158. A plurality of switching elements 164 of large heating value are mounted on the circuit board 153 so that they locate in the return path 177 of the air guide 160.

When electric power is supplied to an electric blower 139, the impeller 159 rotates to produce a suctioning force. Air in front of a casing 161 flows from a suction port 162 into the impeller 159, and is expelled from an outer periphery of the impeller 159. The air expelled from the outer periphery of the impeller 159 reduces its velocity when it passes through the air guide 160, thereby recovering the pressure. The air then passes through the circuit board 153, and is led to the circuit board 154 through openings 163 in the impeller-side bracket 143.

Since the switching elements 164 are mounted so as to locate in the return path 177, they are cooled effectively by the flow of passing air. This embodiment provides a highly efficient electric blower 139 by providing the air guide 160 around the outer periphery of the impeller 159. Because the cooling of the switching elements 164 is made with the airflow, of which a pressure is recovered by the air guide 160, the cooling can be made efficiently while maintaining the efficiency of the electric blower 139.

Thirteenth Exemplary Embodiment

A thirteenth exemplary embodiment of this invention will be described now by referring to FIG. 20. Since the basic structure is generally similar to that of the fourth exemplary embodiment, the description will be skipped, and details will be given mainly for the different points. In addition, like numerals are used to designate like structural components.

Figure 20:
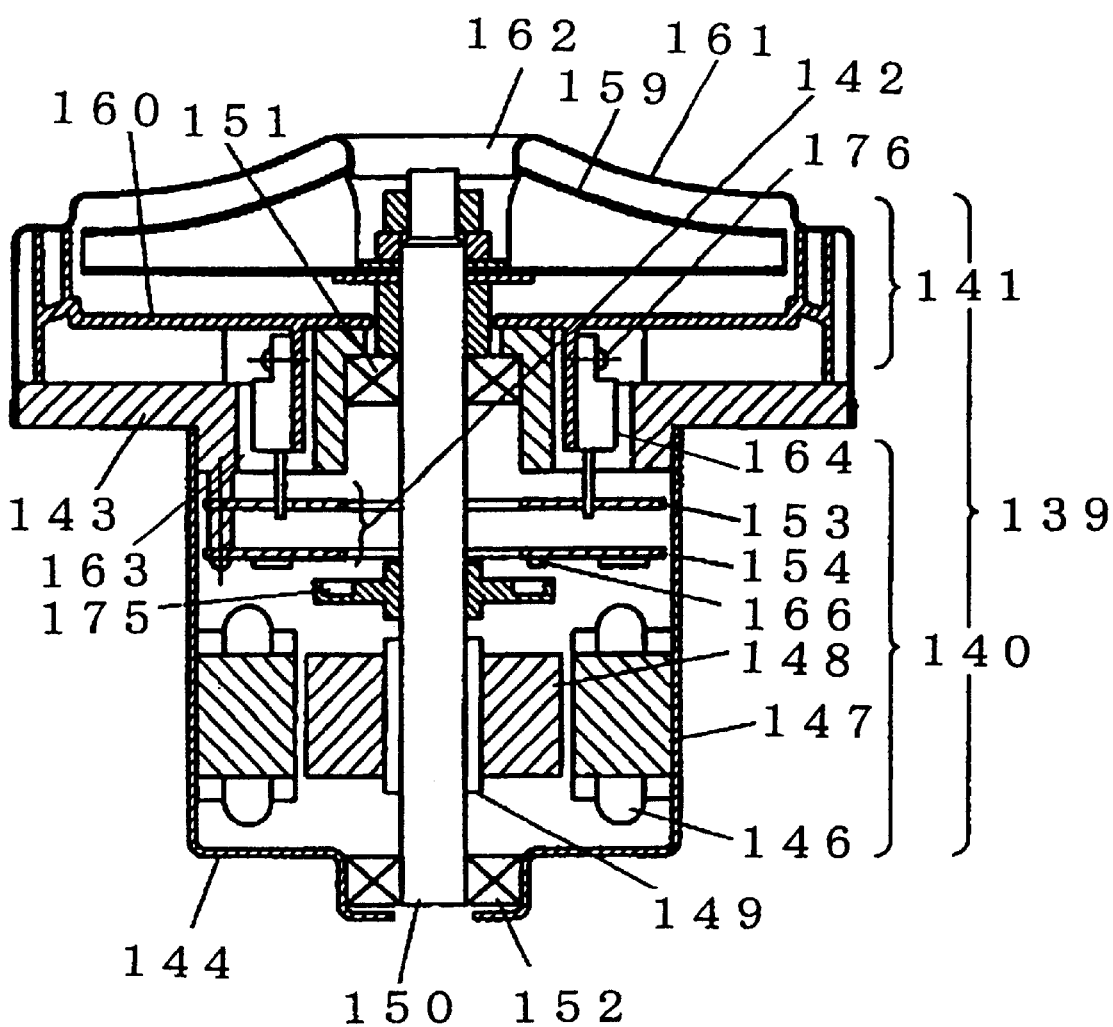
FIG. 20 is a sectioned side view of an electric blower of a thirteenth exemplary embodiment of the present invention.

As shown in FIG. 20, a fan unit 141 is provided with an air guide 160 along a periphery and below an impeller 159 for rectifying an airflow generated by the impeller 159, and for recovering air pressure. The air guide 160 is formed of a material of high heat dissipation. A circuit board 153 and another circuit board 154 constituting an inverter circuit unit 142 are disposed in a space formed between an impeller-side bracket 143, and a rotor 149 and a stator 147. A plurality of switching elements 164 are mounted on the circuit board 153 and are arranged on the bracket 143 such that their longitudinal sides are generally perpendicular to the circuit board. An upper side of each switching element 164 is fixed with a screw 176 so that it is in contact with the air guide 160.

When electric power is supplied to an electric blower 139, the impeller 159 rotates to produce a suctioning force. Air in front of a casing 161 flows from a suction port 162 into the impeller 159, and is expelled from an outer periphery of the impeller 159. The air expelled from the outer periphery of the impeller 159 reduces its velocity when it passes through the air guide 160, thereby recovering the pressure. The air then reaches an upper surface of the impeller-side bracket 143, and is led to the circuit board 154 through openings 163 in the bracket 143.

The switching elements 164 are cooled as they are exposed to the flow of air that has passed through the air guide 160. Since the switching elements 164 are fixed in contact with the air guide 160 of high heat dissipation using screws 176, the entire air guide 160 acts as a radiating fin. Thus, the cooling can be made efficiently by the passage of high-velocity air expelled from the impeller 159.

Fourteenth Exemplary Embodiment

A fourteenth exemplary embodiment of this invention will be described now by referring to FIG. 21. Since the basic structure is generally similar to that of the fifth exemplary embodiment, the description will be skipped, and details will be given mainly for the different points. In addition, like numerals are used to designate like structural components.

Figure 21:
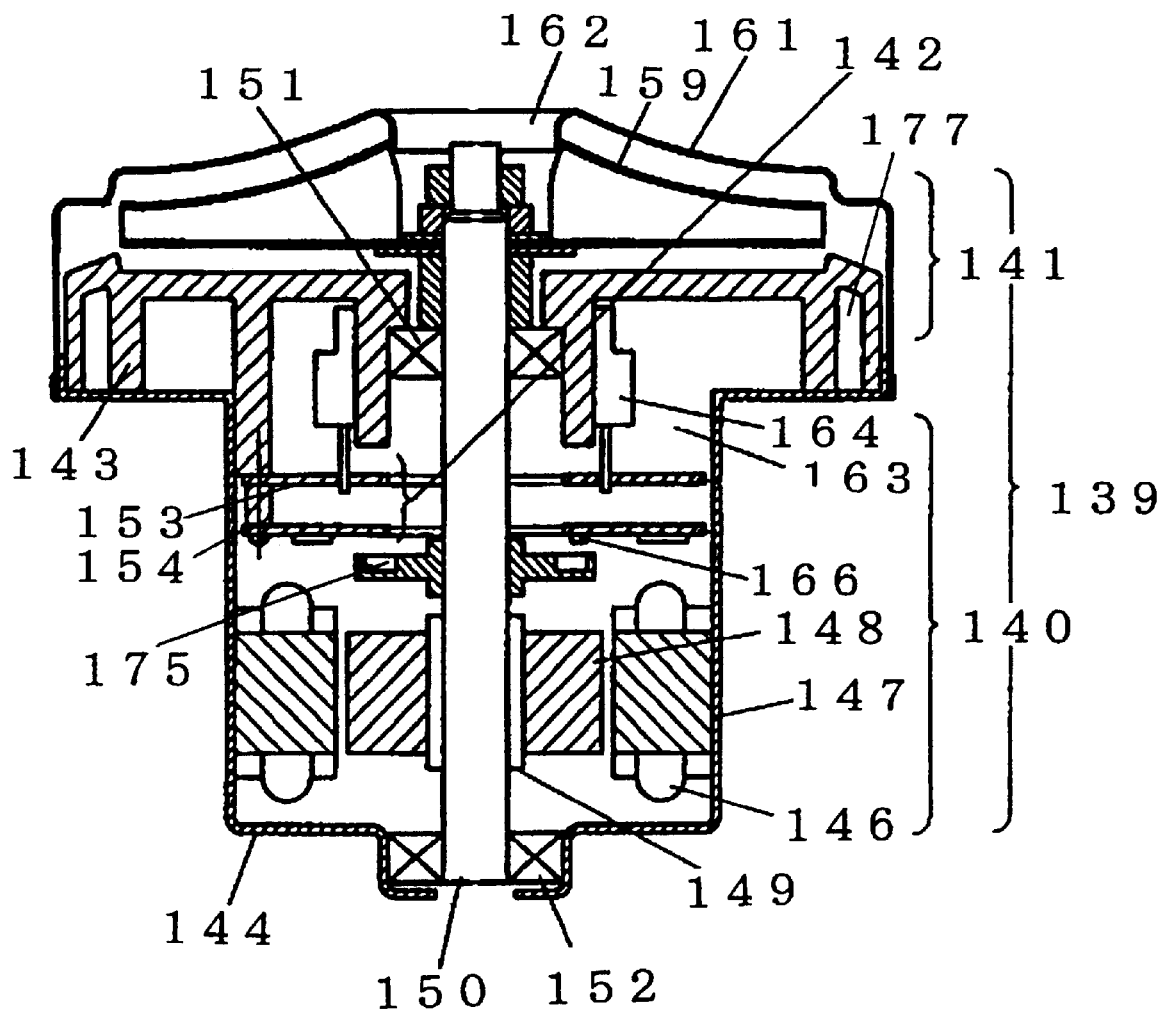
FIG. 21 is a sectioned side view of an electric blower of a fourteenth exemplary embodiment of the present invention.

As shown in FIG. 21, there is disposed below an impeller 159, an impeller-side bracket 143 in the shape of an air guide provided therein with a return path 177. The bracket 143 is secured at its periphery to a motor-side bracket 144. A circuit board 153 and another circuit board 154 constituting an inverter circuit unit 142 are disposed in a space formed between the impeller-side bracket 143, and a rotor 149 and a stator 147. A plurality of switching elements 164 are mounted on the circuit board 153. An upper side of each switching element 164 is fixed so as to contact the impeller-side bracket 143 with adhesive or a similar substance having a high thermal conductivity.

When electric power is supplied to an electric blower 139, the impeller 159 rotates to produce a suctioning force. Air in front of a casing 161 flows from a suction port 162 into the impeller 159, and is expelled from an outer periphery of the impeller 159. The air expelled from the outer periphery of the impeller 159 is rectified by the bracket 143 having the form of air guide, and it is led to the inverter circuit unit 142 through openings 163 in the bracket 143.

The switching elements 164 are cooled during this period as they are exposed to the flow of air that has passed through the air-guide shaped bracket 143. Further, since the switching elements 164 are fixed in contact with the impeller-side bracket 143, the entire bracket 143 acts as a radiating fin. Thus, the cooling can be made efficiently by the passage of high-velocity air expelled from the impeller 159.

The number of components can be reduced by adopting the impeller-side bracket 143 provided with a unitary air guide as described in this embodiment.

Fifteenth Exemplary Embodiment

A fifteenth exemplary embodiment of the present invention will be described next by referring to FIG. 22. Since the basic structure is generally similar to that of the fifth exemplary embodiment, the description will be skipped, and details will be given mainly for the different points. In addition, like numerals are used to designate like structural components.

Figure 22:
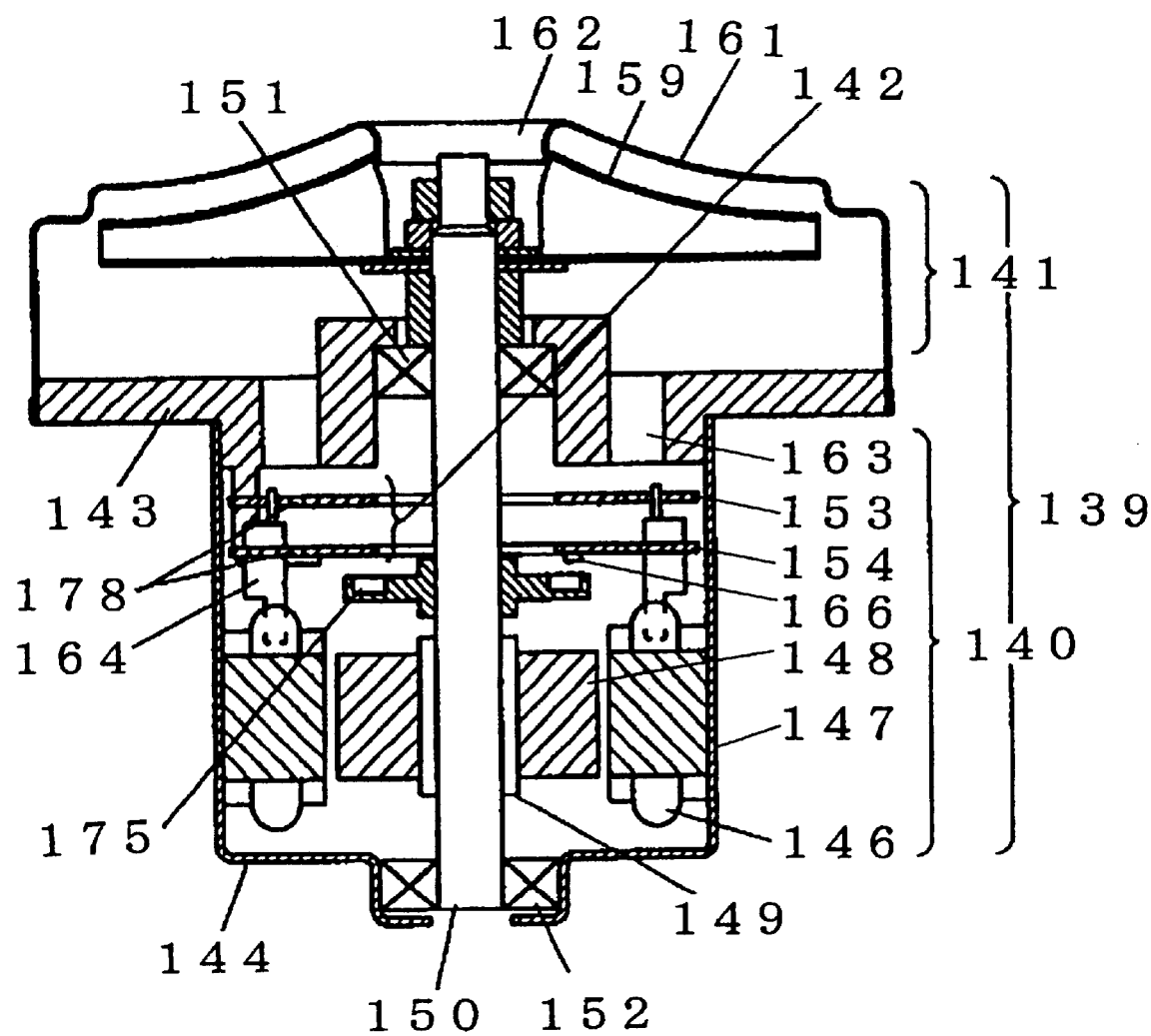
FIG. 22 is a sectioned side view of an electric blower of a fifteenth exemplary embodiment of the present invention.

As shown in FIG. 22, an inverter circuit unit 142 for driving an electric blower 139 is built within a motor unit 140.

A plurality of switching elements 164 are mounted on a circuit board 153 downwardly, projecting through a circuit board 154, in such an orientation that their longitudinal sides are generally perpendicular to the circuit boards. The circuit board 153 and the circuit board 154 are respectively provided with through holes 178 to allow cooling air to pass therethrough. The plurality of switching elements 164 are disposed so that they are partially buried in spaces available between adjoining windings 146 provided in a stator 147.

When electric power is supplied to the electric blower 139, an impeller 159 rotates to produce a suctioning force. Air in front of a casing 161 flows from a suction port 162 into the impeller 159, and is expelled from an outer periphery of the impeller 159. The air expelled from the outer periphery of the impeller 159 is led toward the circuit board 153 and another circuit board 154 through openings 163. The flow of air passes through the respective through holes 178 provided in the circuit boards to cool the switching elements 164.

As described above, an overall length of the motor unit 140 can be reduced because the switching elements 164 are disposed in the spaces available between the adjoining windings 146 in the stator 147. Thus, a total length of the electric blower 139 can be reduced in its entirety.

Sixteenth Exemplary Embodiment

Figure 23:
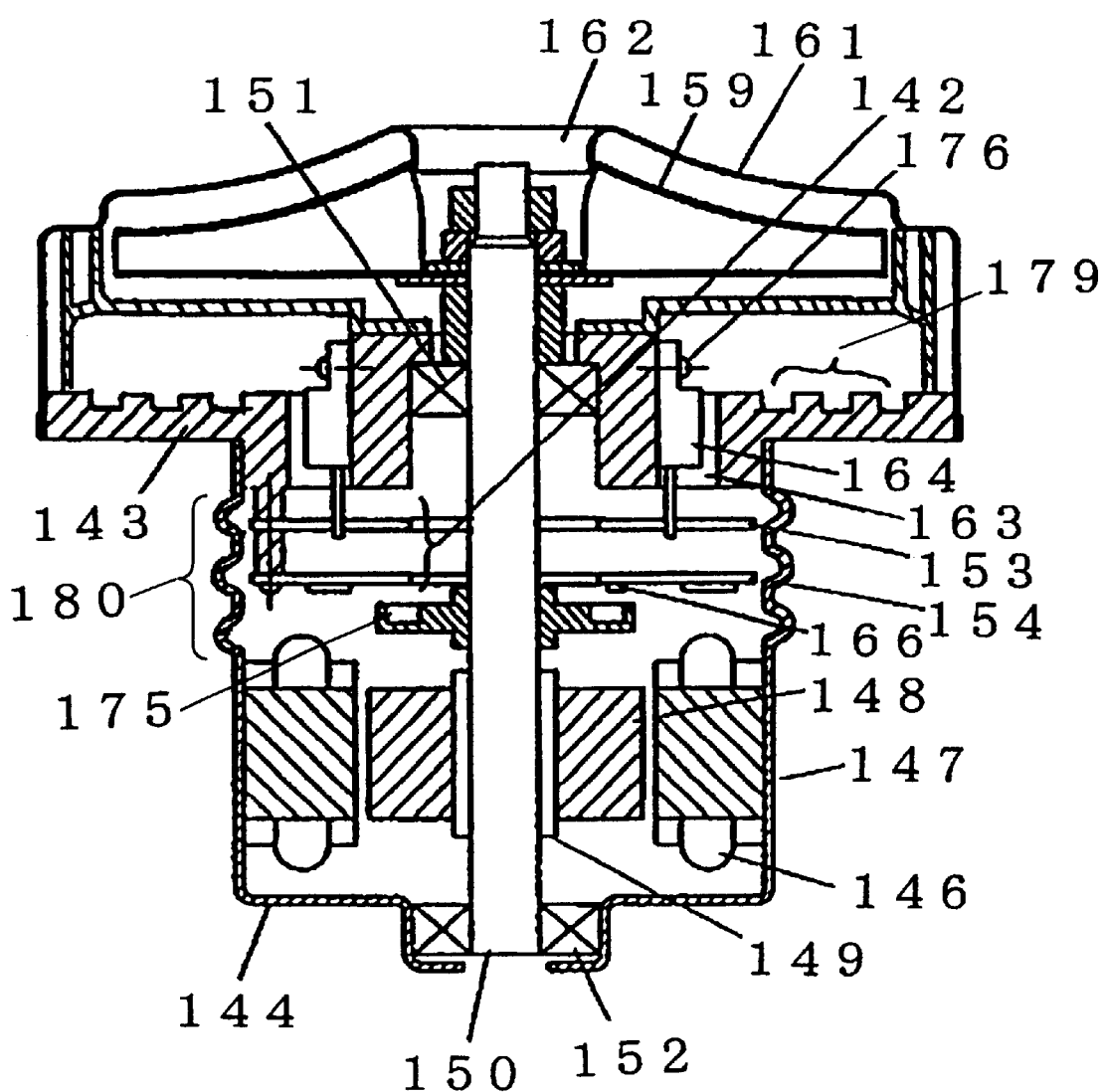
FIG. 23 is a sectioned side view of an electric blower of a sixteenth exemplary embodiment of the present invention.

A sixteenth exemplary embodiment of the present invention will be described next by referring to FIG. 23. Since the basic structure is generally similar to that of the fourth exemplary embodiment, the description will be skipped, and details will be given mainly for the different points. In addition, like numerals are used to designate like structural components.

At least one of an impeller-side bracket 143 and a motor-side bracket 144 is fabricated of a metallic material such as copper, aluminum, magnesium alloy and the like, and is provided with a number of ridges and ditches on its surface. In FIG. 23, a surface of the impeller-side bracket 143 is provided with a group of ridges and ditches 179, and a surface of the motor-side bracket 144 is provided with another group of ridges and ditches 180.

Providing a large number of ridges and ditches 179 and 180 on the surfaces of the impeller-side bracket 143 and the motor-side bracket 144 increases their surface areas and improves their ability to dissipate heat, thereby further improving a cooling efficiency of the heat-generating parts.

Seventeenth Exemplary Embodiment

A seventeenth exemplary embodiment of the present invention will now be described.

Figure 24:
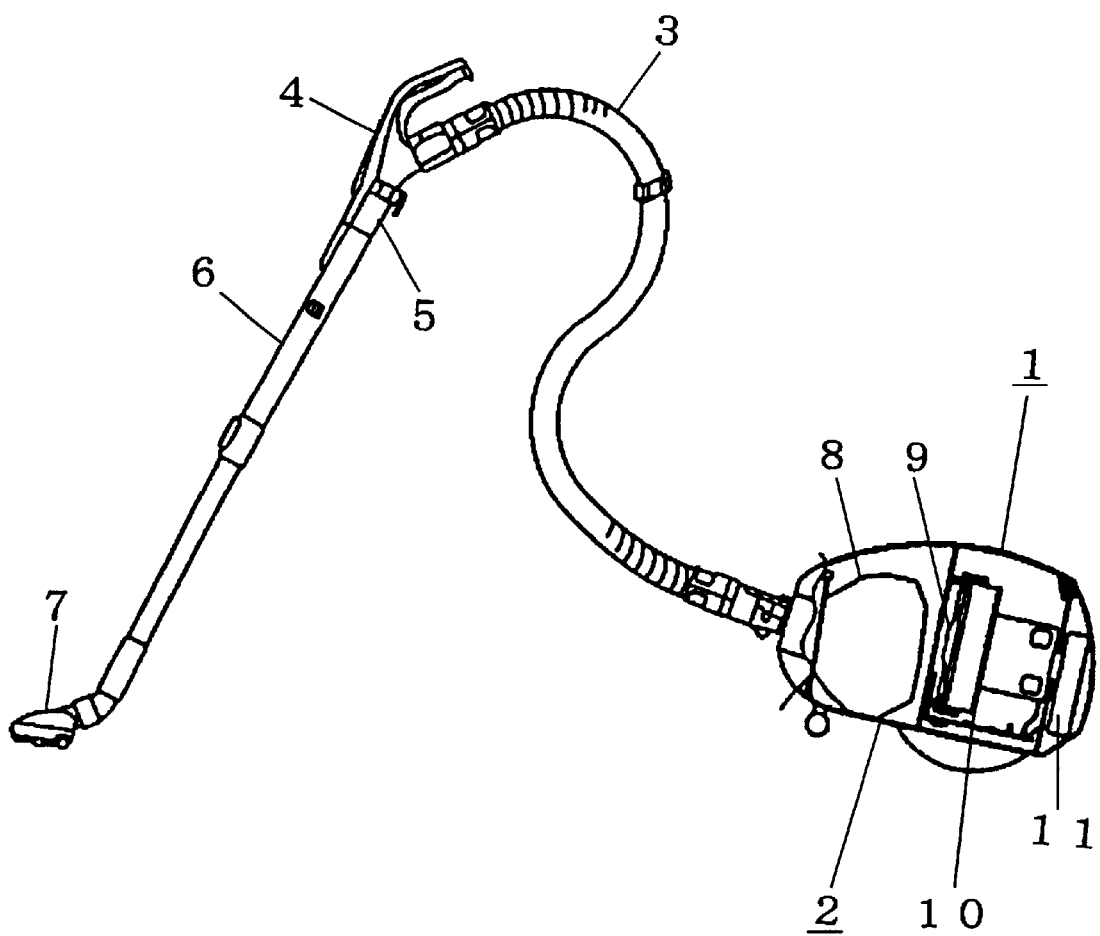
FIG. 24 is a partially sectioned general perspective view of an electric cleaner.
Figure 25:
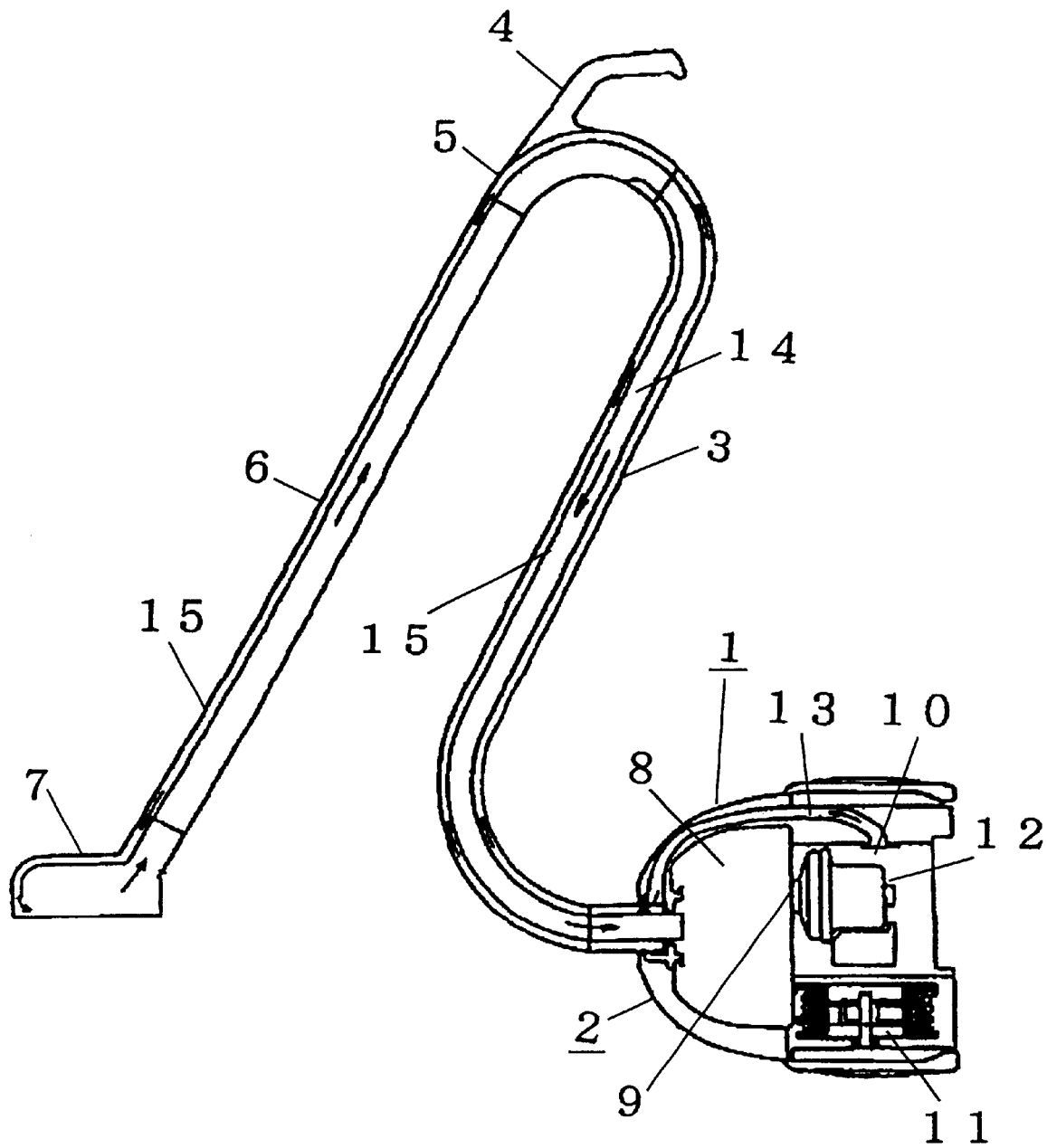
FIG. 25 is a sectioned view of another electric cleaner.
Figure 26:
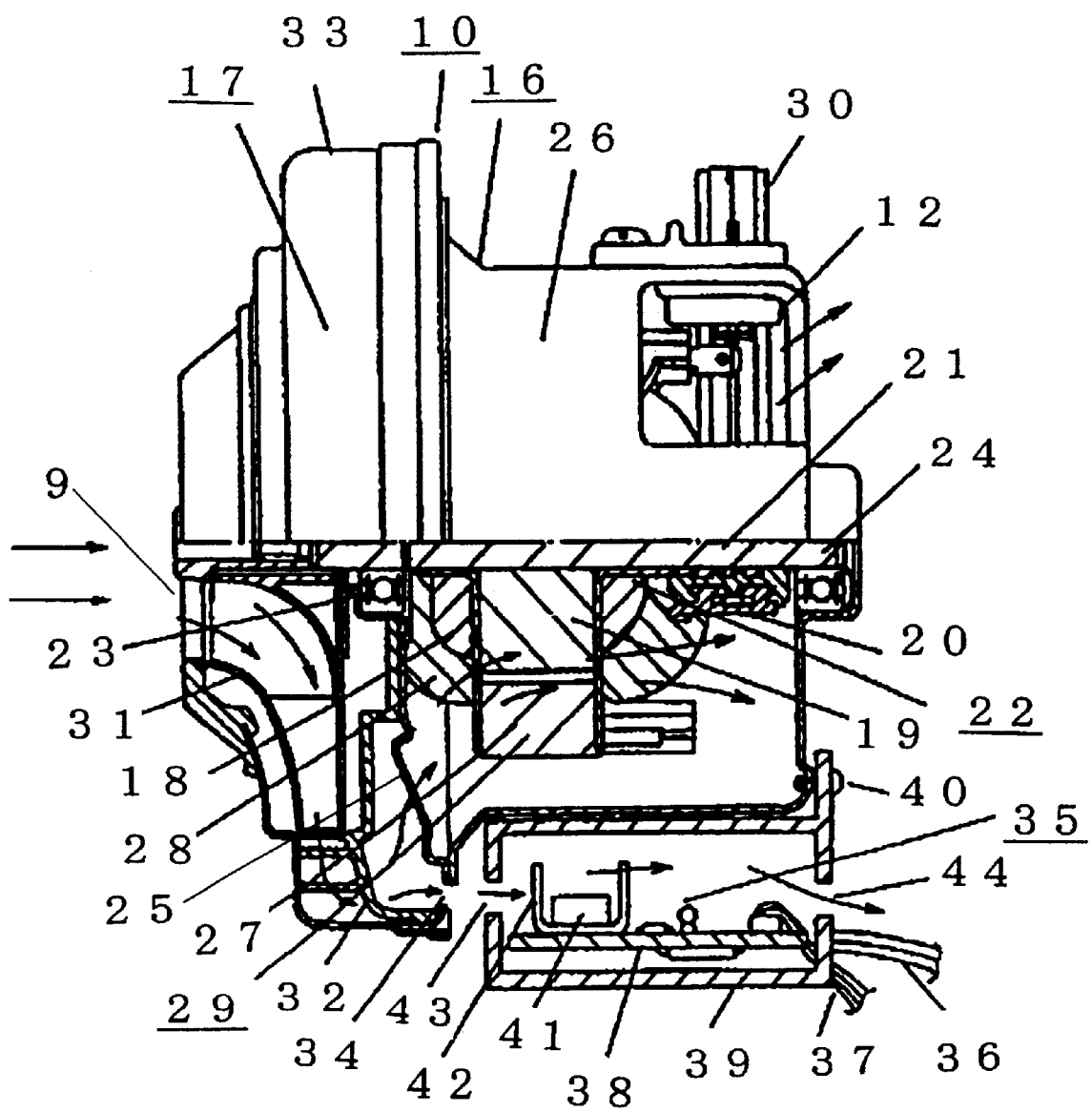
FIG. 26 is a partially sectioned side view of an electric blower of the prior art.
Figure 27:
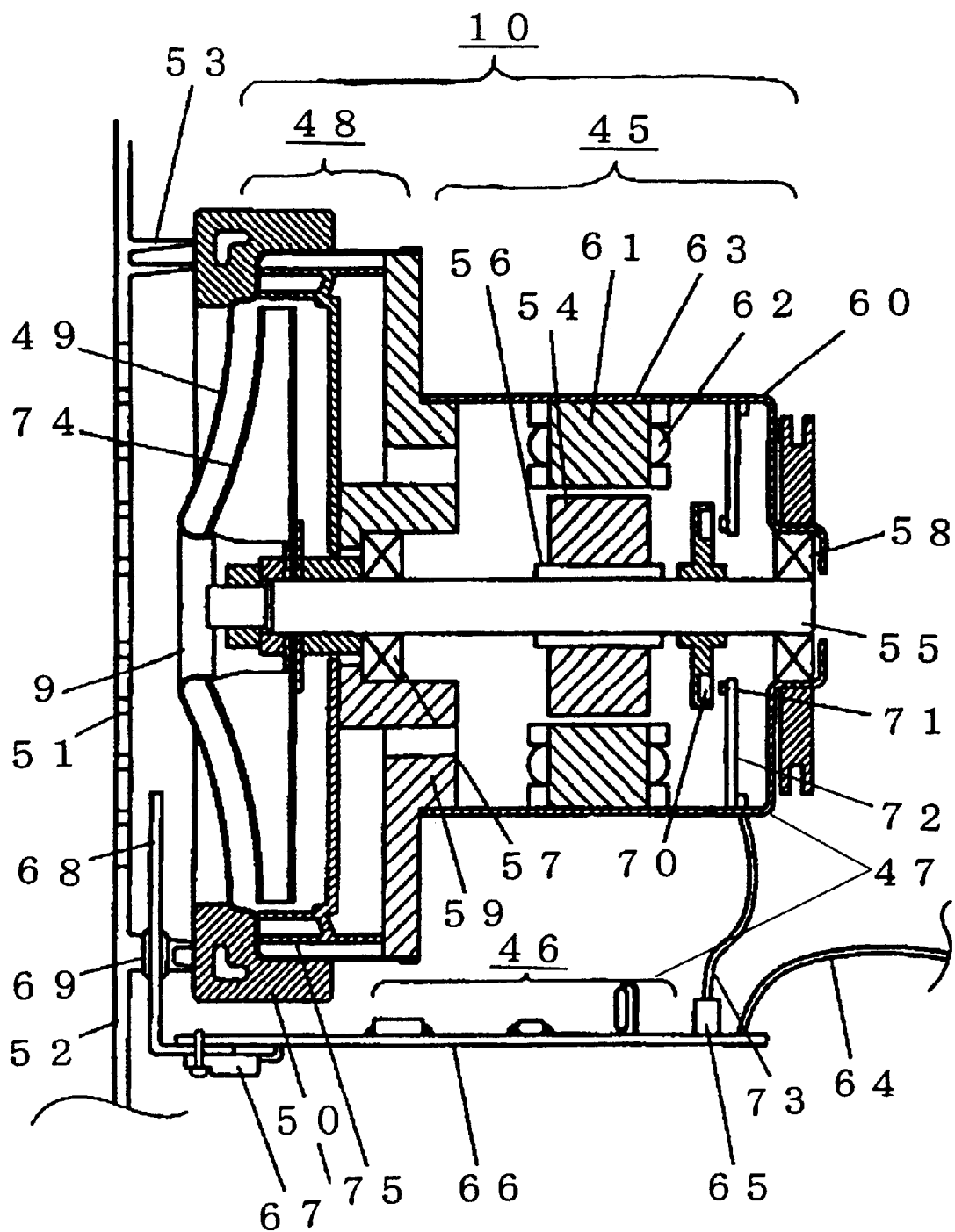
FIG. 27 is a sectioned view of another electric blower of the prior art.

This embodiment represents an electric cleaner that employs any one of the electric blowers described in the first through sixteenth exemplary embodiments. Because the structure and function of the electric cleaner are similar to what have been shown in FIG. 24 and FIG. 25, their details are not described in here.

This exemplary embodiment can realize a main body of the electric cleaner that is small in size, highly reliable, and highly useful, since it uses the small and reliable electric blower.

What is claimed is:

1. An electric blower comprising:
   a motor unit including a stator and a rotor;
   a fan unit including an impeller attached to an output shaft of said rotor and including a casing covering said impeller; and
   a circuit unit including an electric power device for controlling electric power to said motor unit, said circuit unit being arranged between said motor unit and said impeller such that said electric power device is located in an airflow path of air expelled from an outer periphery of said impeller to said motor unit.

2. The electric blower according to claim 1, wherein said circuit unit comprises an inverter circuit, said electric power device of said inverter circuit comprising a switching element for supplying electric power to said stator for driving said motor unit.

3. The electric blower of claim 2, wherein said inverter circuit is secured to a bracket enclosing said motor unit, at a side of said bracket nearest to said impeller.

4. The electric blower of claim 2, wherein said inverter circuit comprises a plurality of circuit boards.

5. The electric blower of claim 2, wherein said inverter circuit comprises a first circuit board for heavy-current for supplying a driving power to said motor unit and a second circuit board for signal-processing.

6. The electric blower of claim 5, wherein said first circuit board is arranged upstream of said second circuit with respect to the airflow path.

7. The electric blower of claim 4 further comprising a position detecting device for detecting a rotational position of said rotor, said position detecting device mounted on one of said plurality of circuit boards that is nearer to said rotor.

8. The electric blower of claim 2, wherein said inverter circuit has temperature detection means for detecting a surrounding temperature.

9. The electric blower of claim 2, further comprising a bracket enclosing said motor unit, wherein at least a portion of said bracket is made of electrically conductive material.

10. The electric blower of claim 2, wherein said inverter circuit comprises a circuit board having a through hole.

11. The electric blower of claim 2, wherein at least a portion of a surface of said inverter circuit is molded with resin.

12. The electric blower according to claim 3, wherein said inverter circuit comprises a circuit board having a ground pattern on the periphery or the vicinity thereof.

13. The electric blower of claim 9, wherein said inverter circuit comprises a circuit board having a ground pattern on the periphery or the vicinity thereof, and an electrically conductive portion of said bracket is connected to said ground pattern.

14. The electric blower of claim 9, wherein an electrically conductive portion of said bracket is connected to a ground pattern on a circuit board of said inverter circuit with at least one of a high-impedance element and a high-impedance resin.

15. The electric blower of claim 2, further comprising a signal-related power supply for supplying power to said inverter circuit, and comprising a power-supply interruption component for interrupting an operation of said signal-related power supply in response to an external signal.

16. The electric blower of claim 2, wherein said rotor has a cooling fan for cooling said inverter circuit.

17. The electric blower according to claim 2, further comprising a sensor magnet for detecting a rotational position of said rotor, said sensor magnet having a fan for cooling said inverter circuit.

18. The electric blower of claim 2, wherein said rotor has a cooling fan.

19. The electric blower of claim 2 further comprising a filter for dust-proofing, said filter disposed in a position where air expelled from and outer periphery of said impeller flows into said motor unit.

20. The electric blower of claim 2, wherein said inverter circuit comprises a circuit board, said switching element for driving said motor unit being mounted on said circuit board so that a longitudinal side of said switching element is perpendicular to said circuit board.

21. The electric blower of claim 20, wherein an impeller-side bracket encloses said motor unit and has an opening, and said switching element is disposed in said opening.

22. The electric blower of claim 2, wherein said inverter circuit comprises a circuit board, said switching element for driving said motor unit being mounted on said circuit board so that a longitudinal side of said switching element is substantially parallel with said circuit board.

23. The electric blower of claim 22, wherein said switching element is fixed in contact with an impeller-side bracket enclosing said motor unit.

24. The electric blower of claim 20, wherein said switching element is fixed in contact with an impeller-side bracket enclosing said motor unit.

25. The electric blower of claim 20, wherein said switching element is disposed on an outer periphery of said impeller.

26. The electric blower of claim 20, wherein said switching element is fixed in contact with a casing covering said impeller.

27. The electric blower of claim 20, wherein said impeller has an air guide around a periphery thereof for rectifying airflow, and said switching element is disposed between said air guide and an impeller-side bracket enclosing said motor unit.

28. The electric blower of claim 27, wherein said impeller-side bracket and said air guide are integrally formed as one unit.

29. The electric blower of claim 20, wherein said stator has stator windings, said switching element being arranged so as to extend between stator windings of said motor unit.

30. The electric blower of claim 21, wherein said impeller-side bracket has a plurality of ridges and ditches.

31. The electric blower of claim 21, further comprising a motor-side bracket enclosing said motor unit, said motor-side bracket having a plurality of ridges and ditches.

32. An electric cleaner comprising:
a dust chamber for collecting dust;
a suction port connected to said dust chamber in communication therewith; and
an electric blower, said electric blower comprising:
a motor unit including a stator and a freely rotatable rotor;
a fan unit including an impeller attached to an output shaft of said rotor and including a casing covering said impeller; and
a circuit unit including an electric power device for controlling electric power to said motor unit, said circuit unit being arranged between said motor unit and said impeller such that said electric power device is located in an airflow path of air expelled from an outer periphery of said impeller to said motor unit.

33. The electric cleaner according to claim 32, wherein said circuit unit comprises an inverter circuit.

34. The electric cleaner of claim 33, wherein said electric blower is operable to be driven by a D.C. power supply.

35. The electric blower according to claim 9, wherein said inverter circuit comprises a circuit board having a ground pattern on the periphery or the vicinity thereof.

36. The electric blower according to claim 2, further comprising a sensor magnet for detecting a rotational position of said rotor, said sensor magnet having a fan for cooling said inverter circuit.

* * * * *

UNITED STATES PATENT AND TRADEMARK OFFICE
CERTIFICATE OF CORRECTION

PATENT NO.    : 6,488,475 B2
DATED         : December 3, 2002
INVENTOR(S)   : Yoshitaka Murata et al.

It is certified that error appears in the above-identified patent and that said Letters Patent is hereby corrected as shown below:

<u>Column 19,</u>
Line 32, "from and outer" should read -- from an outer --.

Signed and Sealed this

Eighteenth Day of March, 2003

JAMES E. ROGAN
*Director of the United States Patent and Trademark Office*